US010173927B2

(12) United States Patent
Atakan et al.

(10) Patent No.: US 10,173,927 B2
(45) Date of Patent: *Jan. 8, 2019

(54) CARBONATABLE CALCIUM SILICATE COMPOSITIONS AND METHODS THEREOF

(71) Applicant: Solidia Technologies, Inc., Piscataway, NJ (US)

(72) Inventors: Vahit Atakan, West Windsor, NJ (US); Sean Quinn, Piscataway, NJ (US); Sadananda Sahu, Piscataway, NJ (US); Deepak Ravikumar, Piscataway, NJ (US); Nicholas DeCristofaro, Piscataway, NJ (US)

(73) Assignee: Solidia Technologies, Inc., Piscataway, NJ (US)

( * ) Notice: Subject to any disclaimer, the term of this patent is extended or adjusted under 35 U.S.C. 154(b) by 510 days.

This patent is subject to a terminal disclaimer.

(21) Appl. No.: 14/817,193

(22) Filed: Aug. 3, 2015

(65) Prior Publication Data

US 2016/0031757 A1 Feb. 4, 2016

Related U.S. Application Data

(60) Provisional application No. 62/032,862, filed on Aug. 4, 2014.

(51) Int. Cl.
*C04B 28/10* (2006.01)
*C04B 28/18* (2006.01)
*C04B 40/02* (2006.01)
*C04B 7/345* (2006.01)

(52) U.S. Cl.
CPC ............ *C04B 28/188* (2013.01); *C04B 7/345* (2013.01); *C04B 7/3453* (2013.01); *C04B 28/10* (2013.01); *Y02P 40/148* (2015.11); *Y02P 40/18* (2015.11)

(58) Field of Classification Search
CPC ....... C04B 28/188; C04B 28/10; C04B 7/345; C04B 7/3453
See application file for complete search history.

(56) References Cited

U.S. PATENT DOCUMENTS

| 4,436,498 A | 3/1984 | Murray |
| 4,956,321 A | 9/1990 | Barrall |
| 5,393,472 A * | 2/1995 | Shaw ...................... C04B 35/22 264/660 |
| 6,610,266 B2 * | 8/2003 | Witham ................... A61K 8/25 423/331 |
| 6,984,377 B2 * | 1/2006 | Witham ................... A61K 8/25 424/401 |
| 8,114,367 B2 | 2/2012 | Riman et al. |
| 8,709,151 B2 * | 4/2014 | Quaghebeur ........... C04B 28/10 106/713 |
| 2005/0284339 A1 | 12/2005 | Brunton et al. |
| 2007/0062416 A1 | 3/2007 | Brzuskiewicz et al. |
| 2009/0133361 A1 | 5/2009 | Vera |
| 2009/0142578 A1 | 6/2009 | Riman et al. |
| 2009/0143211 A1 | 6/2009 | Riman et al. |
| 2010/0077691 A1 | 4/2010 | Constantz et al. |
| 2010/0326328 A1 | 12/2010 | Constantz et al. |
| 2011/0067600 A1 | 3/2011 | Constantz et al. |
| 2011/0067605 A1 | 3/2011 | Constantz et al. |
| 2011/0104469 A1 | 5/2011 | Riman et al. |
| 2011/0129407 A1 | 6/2011 | Riman et al. |
| 2011/0182799 A1 | 7/2011 | Riman et al. |
| 2011/0203489 A1 | 8/2011 | Constantz et al. |
| 2011/0290156 A1 | 12/2011 | Constantz et al. |
| 2012/0312194 A1 | 12/2012 | Riman et al. |
| 2013/0122267 A1 | 5/2013 | Riman et al. |
| 2014/0127450 A1 | 5/2014 | Riman et al. |
| 2014/0127458 A1 | 5/2014 | Riman et al. |
| 2014/0263683 A1 | 9/2014 | Krishnan et al. |
| 2014/0272216 A1 | 9/2014 | Deo et al. |
| 2014/0314990 A1 | 10/2014 | Henn et al. |
| 2014/0322083 A1 | 10/2014 | Kuppler et al. |
| 2014/0342124 A1 | 11/2014 | Zambrzycki et al. |
| 2014/0361471 A1 | 12/2014 | Hu et al. |
| 2014/0363665 A1 | 12/2014 | Kuppler et al. |
| 2015/0056437 A1 | 2/2015 | Deo et al. |
| 2015/0225295 A1 | 8/2015 | McCandlish et al. |
| 2015/0266778 A1 | 9/2015 | Riman et al. |
| 2015/0336852 A1 | 11/2015 | Patten et al. |
| 2016/0031757 A1 | 2/2016 | Atakan et al. |

(Continued)

FOREIGN PATENT DOCUMENTS

JP   2001278679 A * 10/2001 ............. C04B 28/04
SU     1837610 A1 * 6/1996 ............... C09C 1/02

(Continued)

OTHER PUBLICATIONS

PCT/US2014/024987, Int'l Search Report of ISA, dated Aug. 14, 2014.
PCT/US2014/025278, Int'l Search Report of ISA, dated Aug. 14, 2014.
PCT/US2014/024996, Int'l Search Report of ISA, dated Aug. 21, 2014.
PCT/US2014/025958, Int'l Search Report of ISA, dated Sep. 4, 2014.
PCT/US2014/040816, Int'l Search Report of ISA, dated Oct. 30, 2014.
PCT/US2014/040789, Int'l Search Report of ISA, dated Sep. 30, 2014.
PCT/US2014/059024, Int'l Search Report of ISA, dated Apr. 2, 2015.

(Continued)

*Primary Examiner* — Anthony J Green
(74) *Attorney, Agent, or Firm* — Dentons US LLP

(57) ABSTRACT

The invention provides novel carbonatable calcium silicate compositions and carbonatable calcium silicate phases that are made from widely available, low cost raw materials by a process suitable for large-scale production. The method of the invention is flexible in equipment and production requirements and is readily adaptable to manufacturing facilities of conventional cement. The invention offers an exceptional capability to permanently and safely sequesters $CO_2$.

14 Claims, 28 Drawing Sheets

(56) References Cited

U.S. PATENT DOCUMENTS

| | | |
|---|---|---|
| 2016/0096773 A1 | 4/2016 | Quinn et al. |
| 2016/0168720 A1 | 6/2016 | Jain et al. |

FOREIGN PATENT DOCUMENTS

| | | |
|---|---|---|
| WO | 2009/103885 A2 | 8/2009 |
| WO | 2009/102360 A2 | 1/2010 |
| WO | 2011/053598 A2 | 5/2011 |
| WO | 2011/090967 A2 | 7/2011 |
| WO | 2012/122031 A2 | 9/2012 |
| WO | 2014/159832 A2 | 10/2014 |
| WO | 2014/160168 A2 | 10/2014 |
| WO | 2014/165252 A2 | 10/2014 |
| WO | 2014/165257 A2 | 10/2014 |
| WO | 2014/197532 A2 | 12/2014 |
| WO | 2014/197545 A2 | 12/2014 |
| WO | 2015/026900 A2 | 2/2015 |
| WO | 2015/051243 A2 | 4/2015 |
| WO | 2015/103107 A2 | 7/2015 |
| WO | 2015/112655 A2 | 7/2015 |
| WO | 2016/022485 A2 | 2/2016 |
| WO | 2016/022522 A2 | 2/2016 |
| WO | 2016/054602 A2 | 4/2016 |

OTHER PUBLICATIONS

PCT/US2014/072494, Int' Search Report and Written Opinion of ISA, dated Jun. 4, 2015.

PCT/US2015/043452, Int' Search Report and Written Opinion of ISA, dated Dec. 17, 2015.

PCT/US2015/043540, Int' Search Report and Written Opinion of ISA, dated Jan. 27, 2016.

PCT/US2016/023181, Int' Search Report and Written Opinion of ISA, dated Jun. 13, 2016.

PCT/US2015/053879, Int' Search Report and Written Opinion of ISA, dated Jan. 28, 2016.

PCT/US2016/023193, Int' Search Report and Written Opinion of ISA, dated Jun. 13, 2016.

\* cited by examiner

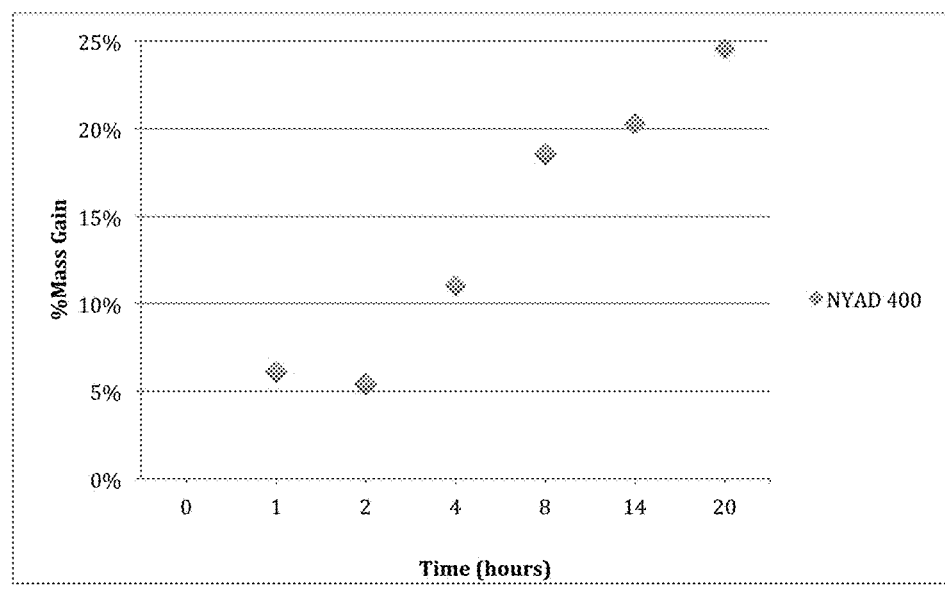
FIG. 11. Mass gain of NYAD 400 mineral wollastonite following a 60°C reaction with $CO_2$.

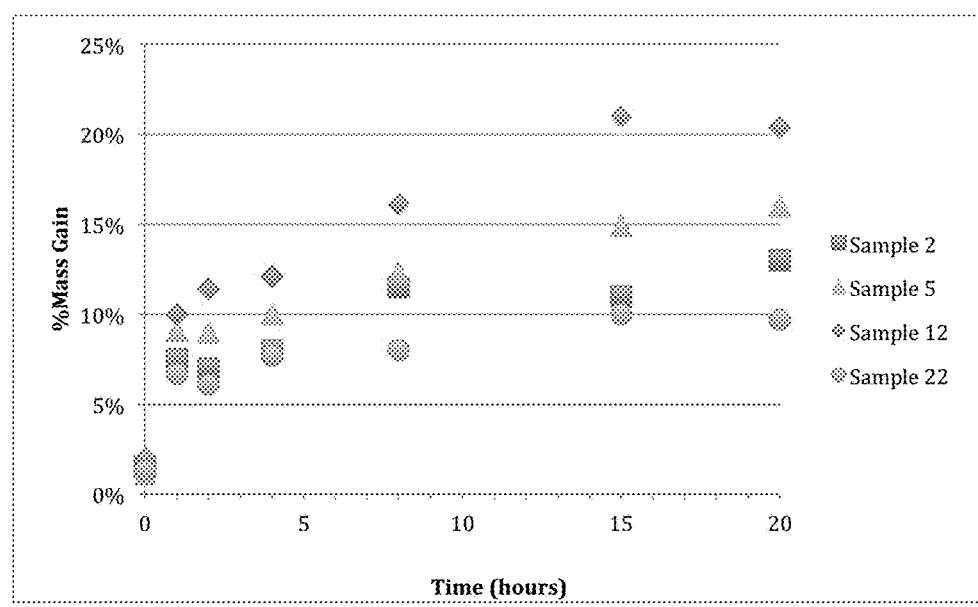
FIG. 12. Mass gain of rotary kiln calcium silicate compositions following a 60°C reaction with $CO_2$. The mass gain at 0 hours indicates the mass gain after wetting the powder, due to the hydration of free lime.

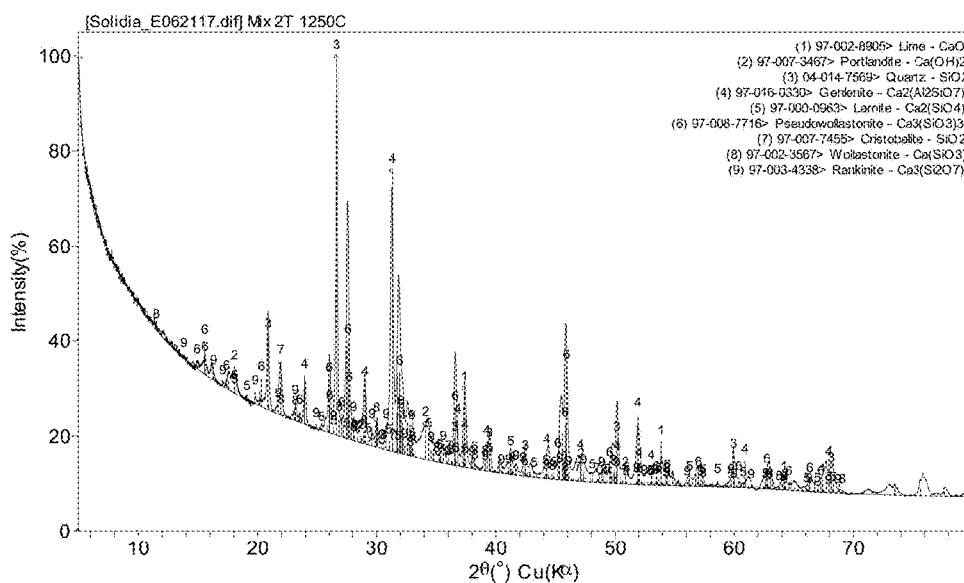
FIG. 13a. X-Ray diffraction data and crystallographic peaks used for Reitveld refinement, as is rotary kiln sample 12.

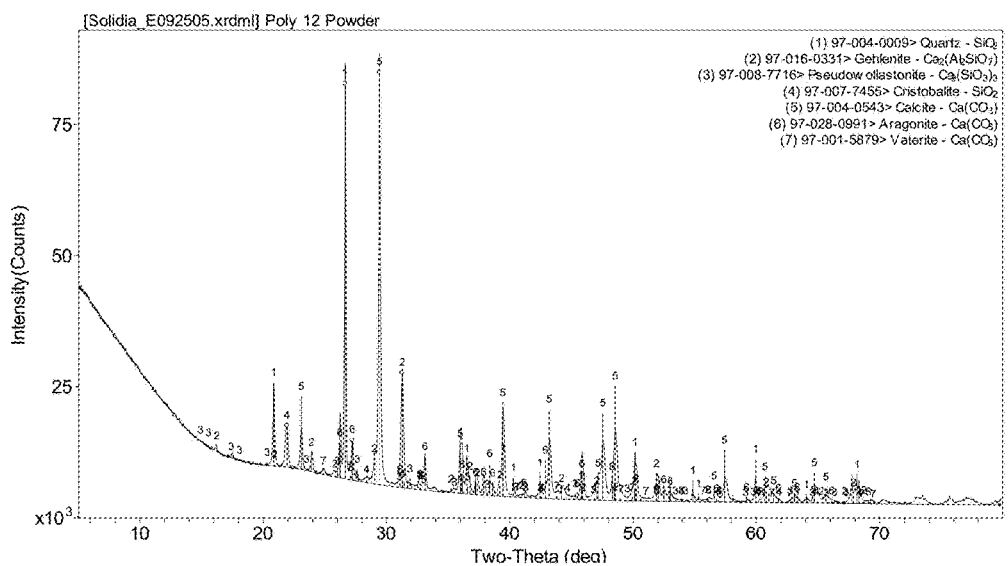
FIG. 13b. X-Ray diffraction data and crystallographic peaks used for Reitveld refinement, as is rotary kiln calcium silicate composition sample 12 after a 20 hour carbonation at 60°C.

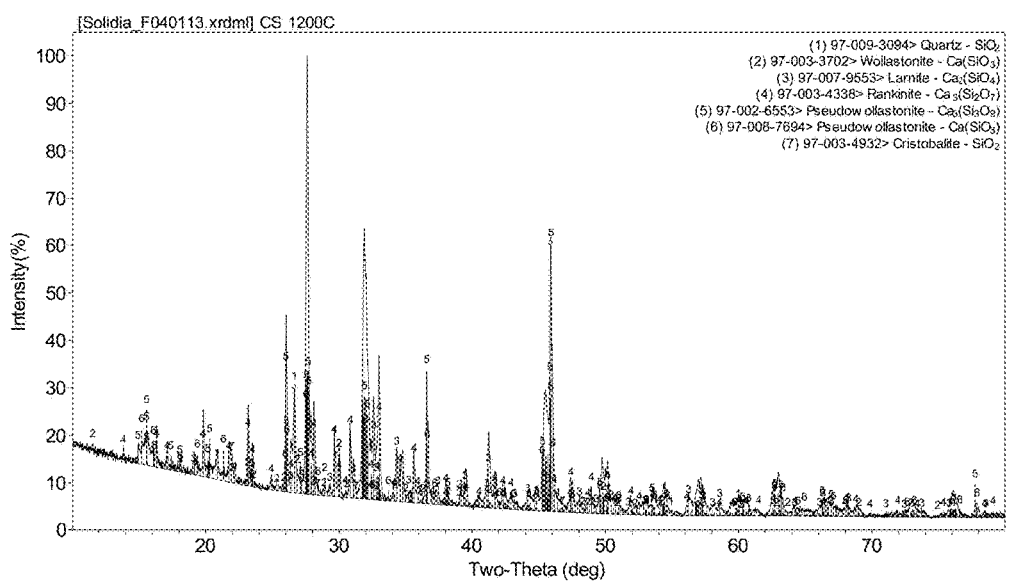
FIG. 14. X-Ray diffraction pattern and associated crystallographic peaks of calcium silicate compositions produced from high purity chemicals in a box furnace.

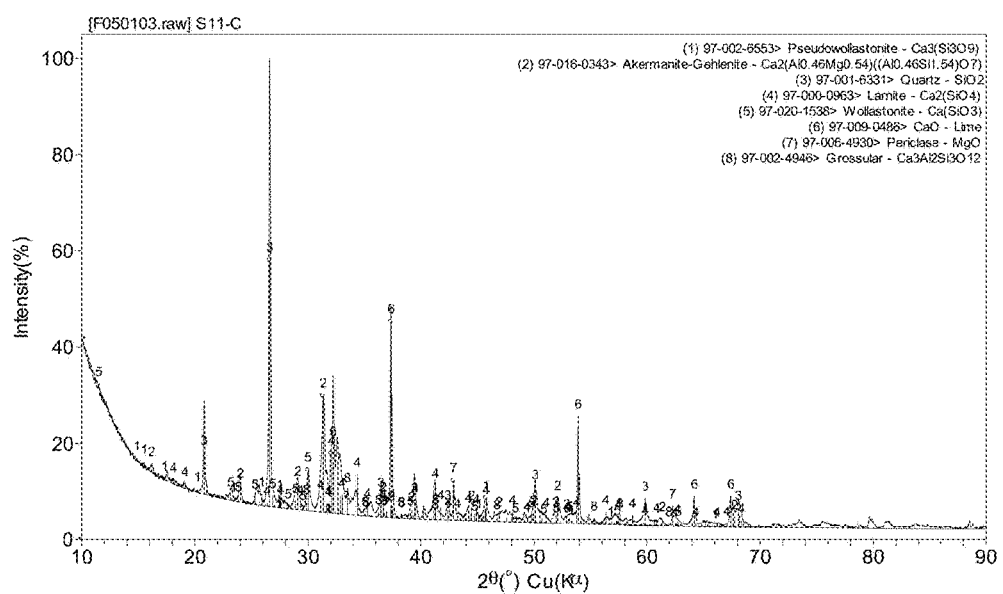
FIG. 15a. X-Ray diffraction pattern of siliceous limestone calcined at 1,000°C.

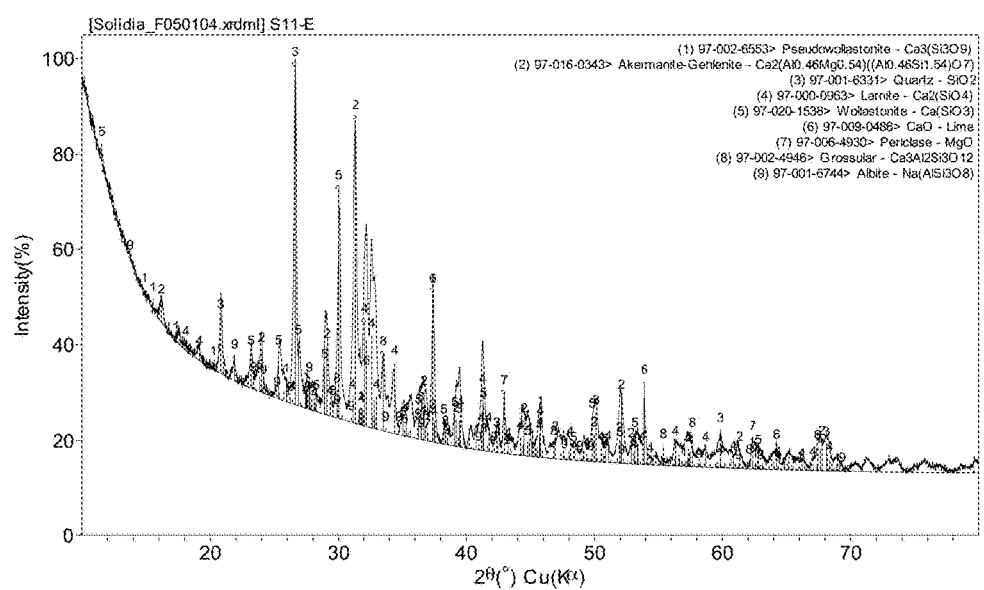
FIG. 15b. X-Ray diffraction pattern of siliceous limestone calcined at 1,100°C.

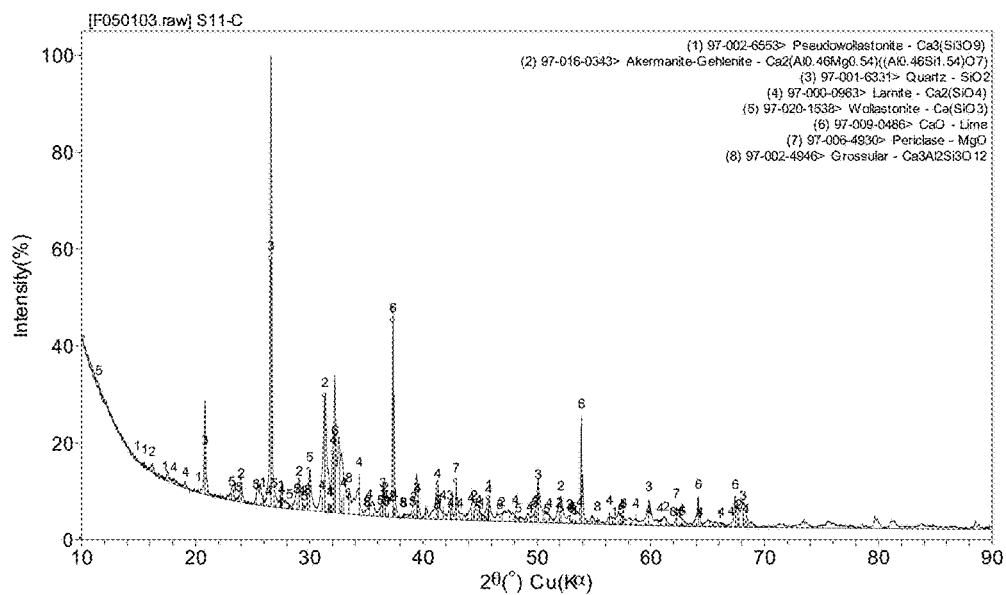
FIG. 15c. X-Ray diffraction pattern of siliceous limestone calcined at 1,200°C.

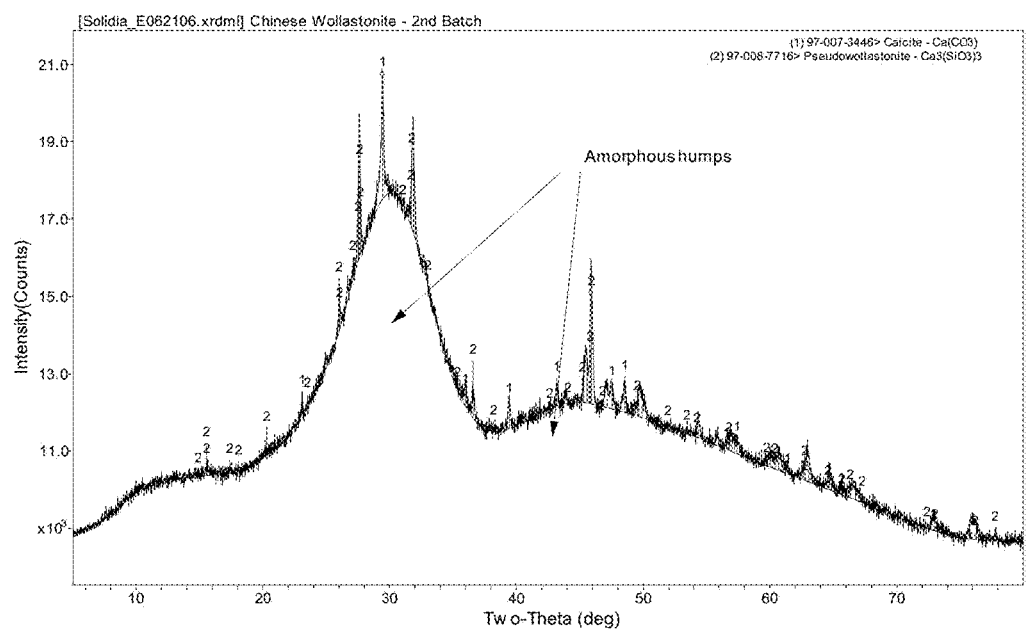
FIG. 16. Synthetic high temperature calcium silicate composition. The X-Ray diffraction pattern indicates that the material is primarily amorphous in structure.

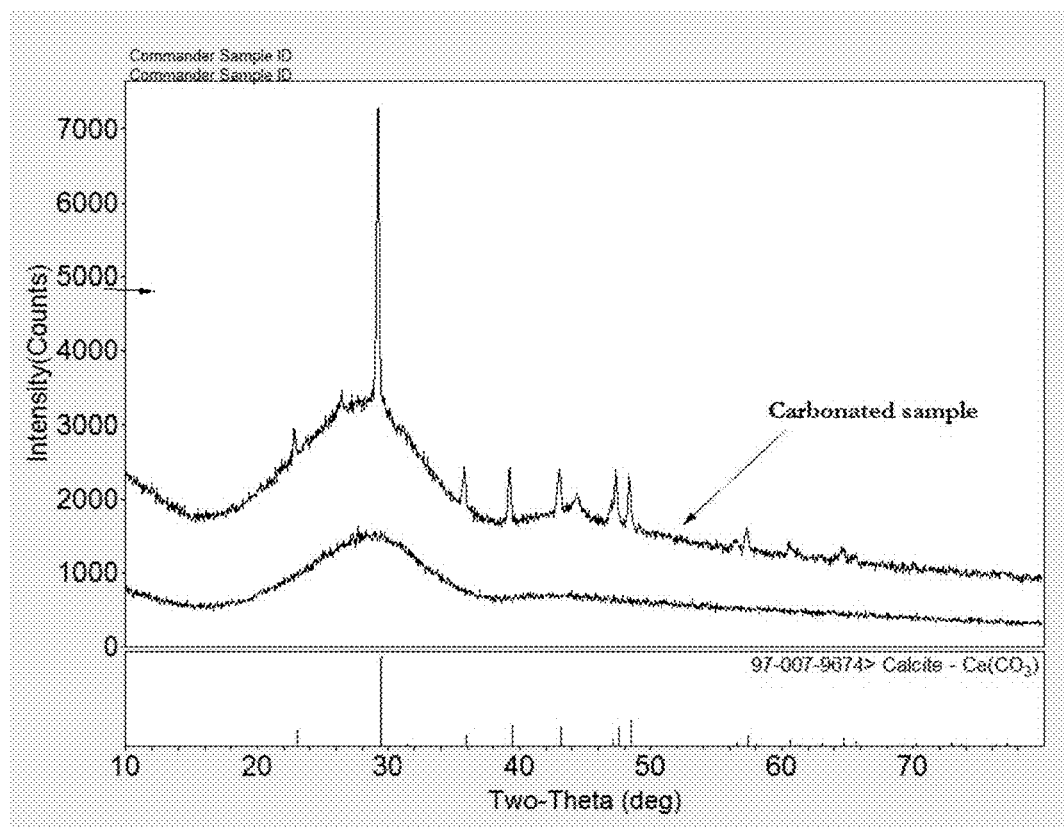
FIG. 17. X-Ray diffraction spectrum of a synthetic amorphous calcium silicate composition (bottom) and the same sample after $CO_2$ curing at 60°C (top).

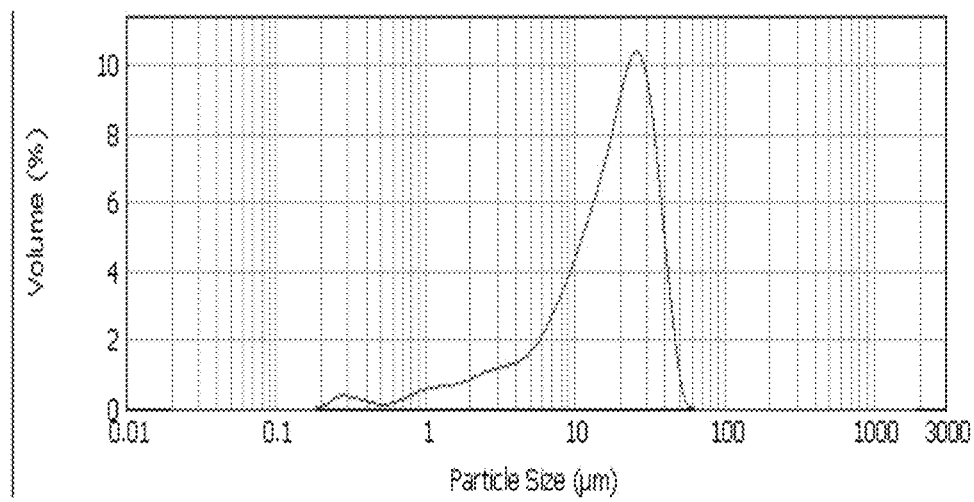
FIG. 18. Particle size distribution of jet milled exemplary calcium silicate composition (SC-C2).

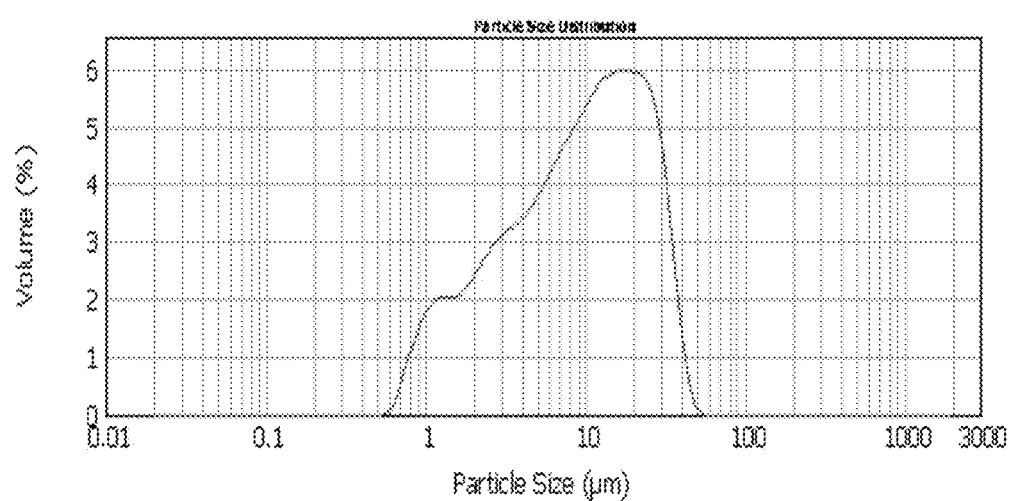
FIG. 19. Particle size distribution of jet milled + ball milled exemplary calcium silicate composition (SC-C2a).

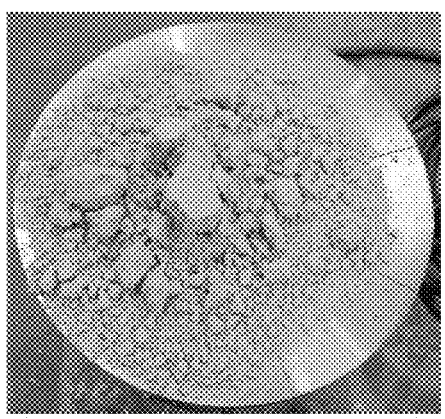 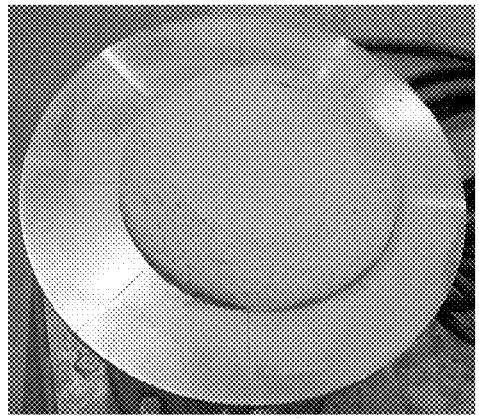
(a) (b)
FIG. 20. Flow of SC-C2 and CS-C2a mortars with water-to-binder ratio of 0.375 with (a) SC-C2 (b) SC-C2a.

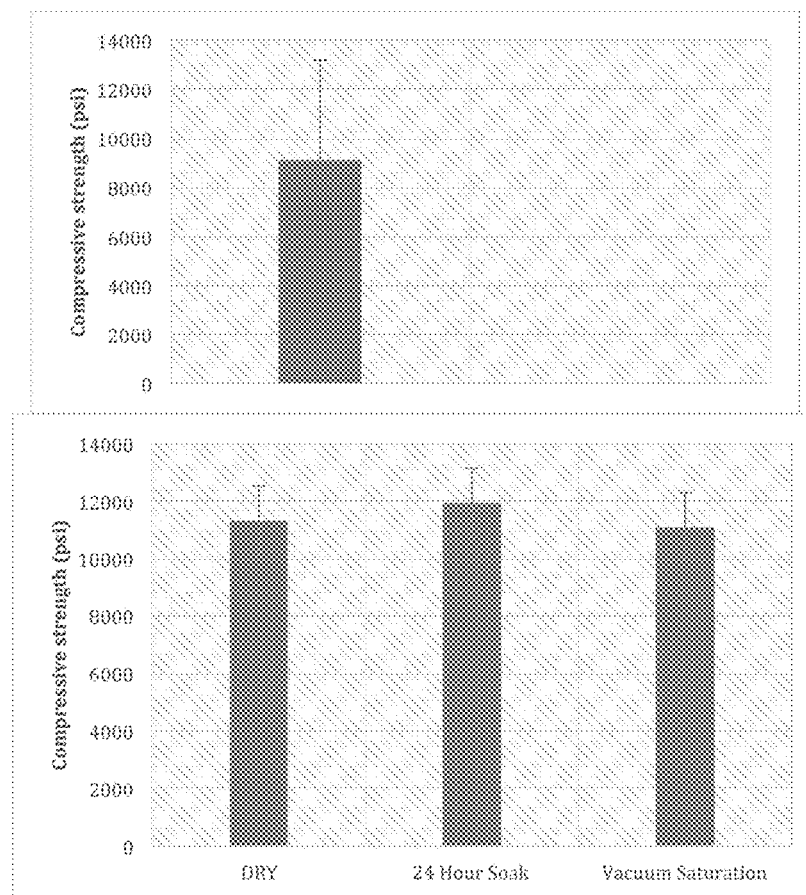
FIG. 21. Compressive strength of 4"x8" cylinder under different condition for concrete mixes made with SC-C2 (top) and SC-C2a (bottom). (Dry and 24 hour soak is an average of 5 samples each and vacuum saturation test was conducted with 3 cylinders).

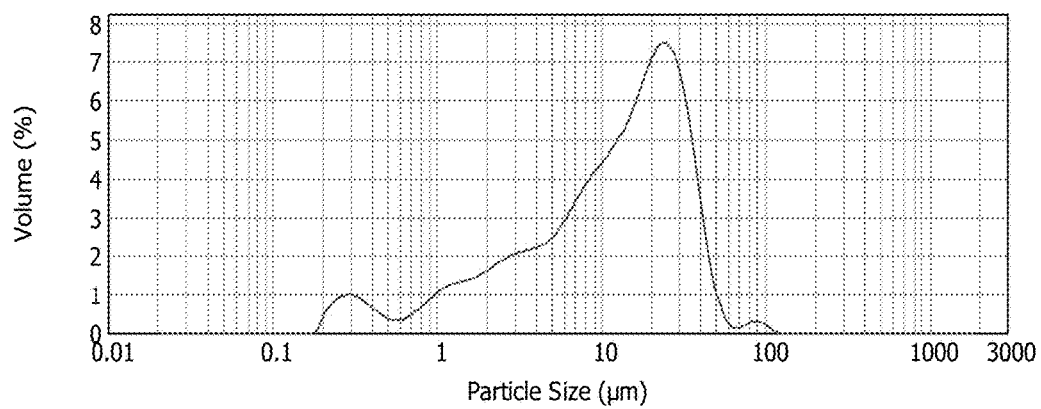
FIG. 22. Milled clinker calcium silicate composition produced in a close circuit ball mill with a relatively narrow distribution.

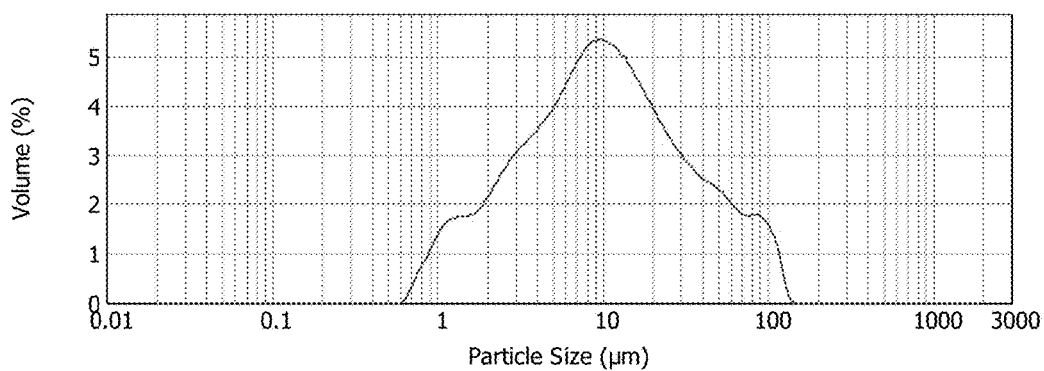
FIG. 23. Calcium silicate composition clinker milled to achieve a broad particle size with a reduced mean particle size vs. the commercially milled powder.

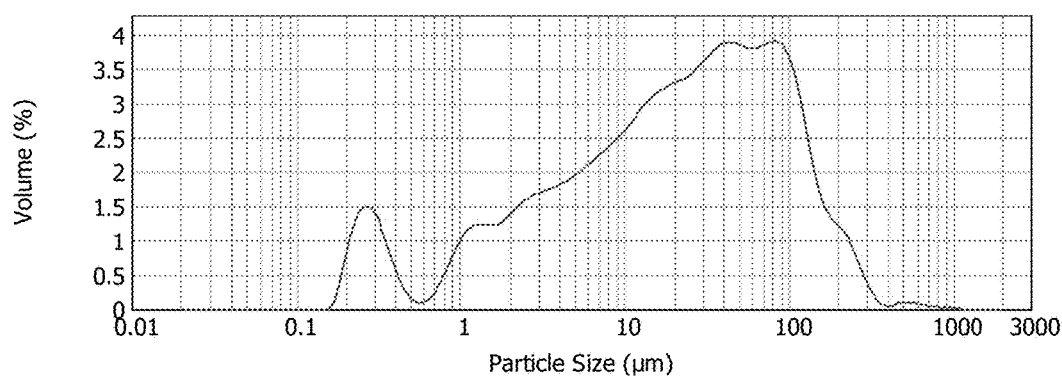
FIG. 24. Calcium silicate composition clinker milled to achieve a broad particle size with in increased mean particle size vs. commercially milled powder.

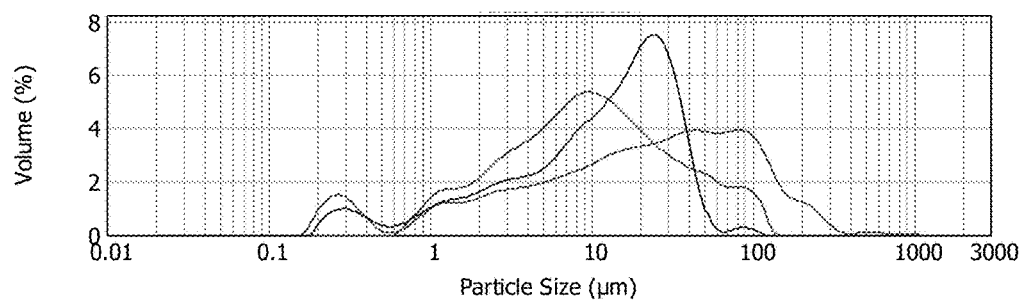
FIG. 25. Industrially milled calcium silicate composition(blue) compared with similar broad distributions milled to coarser and finer mean particle sizes.

CARBONATABLE CALCIUM SILICATE COMPOSITIONS AND METHODS THEREOF

PRIORITY CLAIMS AND RELATED PATENT APPLICATIONS

This application claims the benefit of priority from U.S. Provisional Application Ser. No. 62/032,862 filed on Aug. 4, 2014, the entire content of which is incorporated herein by reference in its entirety.

FIELD OF THE INVENTION

The invention generally relates to calcium silicate compositions. More particularly, the invention relates to novel carbonatable calcium silicate compositions and phases, and methods for their manufacture and use. These calcium silicate compositions and phases are suitable for use as non-hydraulic cement that hardens by a carbonation process. They may be applied in a variety of concrete components in the infrastructure, construction, pavement and landscaping industries.

BACKGROUND OF THE INVENTION

Concrete is the most consumed man-made material in the world. A typical concrete is made by mixing Portland cement, water and aggregates such as sand and crushed stone. Portland cement is a synthetic material made by burning a mixture of ground limestone and clay, or materials of similar composition in a rotary kiln at a sintering temperature of 1450° C. Portland cement manufacturing is not only an energy-intensive process, but one which releases considerable quantities of greenhouse gas ($CO_2$). The cement industry accounts for approximately 5% of global anthropogenic $CO_2$ emissions. More than 60% of this $CO_2$ comes from the chemical decomposition, or calcination of limestone.

There has been growing effort to reduce total $CO_2$ emissions within the cement industry. According to a proposal by the International Energy Agency, the cement industry needs to reduce its $CO_2$ emissions from 2.0 Gt in 2007 to 1.55 Gt by 2050. This represents a daunting task because, over this same period, cement production is projected to grow from 2.6 Gt to 4.4 Gt.

To meet this formidable challenge, a revolutionary approach to cement production is required that significantly reduces the energy requirement and $CO_2$ emissions of a cement plant. Ideally, the new approach preferably offers the ability to permanently and safely sequester $CO_2$ while being adaptable and flexible in equipment and production requirements, allowing manufacturers of conventional cement to easily convert to the new platform.

SUMMARY OF THE INVENTION

The calcium silicate compositions of the invention provide a foundation for a revolutionary approach to cement production that significantly reduces the energy requirement and $CO_2$ emissions. The disclosed carbonatable calcium silicate compositions are made from widely available, low cost raw materials by a process suitable for large-scale production. The method of the invention is flexible in equipment and production requirements and is readily adaptable to manufacturing facilities of conventional cement. The unique approach also offers an exceptional capability to permanently and safely sequester $CO_2$.

These calcium silicate compositions can be used in a variety of concrete applications such as in construction, pavements and landscaping, and infrastructure with reduced equipment need, improved energy consumption, and more desirable carbon footprint.

In one aspect, the invention generally relates to the calcium silicate compositions and their chemistry. The composition includes various calcium silicates. The molar ratio of elemental Ca to elemental Si in the composition is from about 0.8 to about 1.2. The compositions may also include metal oxides of Al, Fe, Mg constituting about 30% or less by total oxide mass. The calcium silicate composition comprises a blend of discrete calcium silicate phases, selected from one or more of CS (wollastonite or pseudowollastonite), C3S2 (rankinite), C2S (belite or larnite or bredigite) and a calcium-silicate based amorphous phase comprising about 30% or more of the total phases. The amorphous phase may additionally incorporate Al, Fe and Mg ions and other impurity or trace ions present in the raw materials. Each of these calcium silicate phases is suitable for carbonation with $CO_2$.

The calcium silicate compositions may also include small quantities of residual CaO (lime) and $SiO_2$ (silica).

The calcium silicate composition may also include small quantities of C3S (alite, $Ca_3SiO_5$).

The C2S phase present within the calcium silicate composition may exist as $(Ca_7Mg(SiO_4)_4)$ (bredigite) or as any of $\alpha$-$Ca_2SiO_4$, $\beta$-$Ca_2SiO_4$ or $\gamma$-$Ca_2SiO_4$ polymorph or combination thereof.

The calcium silicate compositions may also include quantities of inert phases (i.e., non-carbonatable under typical carbonation conditions) such as melilite type minerals (melilite or gehlenite or akermanite) with the general formula $(Ca,Na,K)_2[(Mg,Fe^{2+},Fe^{3+},Al,Si)_3O_7]$ and ferrite type minerals (ferrite or brownmillerite or C4AF) with the general formula $Ca_2(Al,Fe^{3+})_2O_5$.

The calcium silicate composition is suitable for carbonation with $CO_2$ at a temperature of about 30° C. to about 90° C. to form $CaCO_3$ with mass gain of about 10% or more.

In another aspect, the invention generally relates to a carbonatable calcium silicate composition in powder form having a mean particle size (d50) of about 8 μm to about 25 μm, with 10% of particles (d10) sized below about 0.1 μm to about 3 μm, and 90% of particles (d90) sized above about 35 μm to about 100 μm.

In yet another aspect, the invention generally relates to a carbonated material that is produced from a calcium silicate composition disclosed herein.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 11 shows exemplary results regarding mass gain of NYAD 400 mineral wollastonite following a 60° C. reaction with $CO_2$.

FIG. 12 shows exemplary results regarding mass gain of some rotary kiln sample material following a 60° C. reaction with $CO_2$. The mass gain at 0 hours indicates the mass gain after wetting the powder, due to the hydration of free lime.

FIG. 13a shows exemplary results regarding X-Ray diffraction data and crystallographic peaks used for Reitveld refinement, as is cement sample 12.

FIG. 13b shows exemplary results regarding X-Ray diffraction data and crystallographic peaks used for Reitveld refinement, as is cement sample 12 after a 20 hour carbonation at 60° C.

FIG. 14 shows exemplary results regarding X-Ray diffraction pattern and associated crystallographic peaks of calcium silicates phases produced from high purity chemicals in a box furnace.

FIG. 15a shows exemplary results regarding X-Ray diffraction pattern of siliceous limestone calcined at 1,000° C.

FIG. 15b shows exemplary results regarding X-Ray diffraction pattern of siliceous limestone calcined at 1,100° C.

FIG. 15c shows exemplary results regarding X-Ray diffraction pattern of siliceous limestone calcined at 1,200° C.

FIG. 16 shows exemplary results regarding synthetic high temperature wollastonite cement. The X-Ray diffraction pattern indicates that the material is primarily amorphous in structure.

FIG. 17 shows exemplary results regarding X-Ray diffraction spectrum of a synthetic wollastonite glass (bottom) and the same sample\after $CO_2$ curing at 60° C. (top).

FIG. 18 shows exemplary particle size distribution of jet milled exemplary cement composition (SC-C2).

FIG. 19 shows exemplary particle size distribution of jet milled+ball milled exemplary cement composition (SC-C2a).

FIG. 20 shows exemplary data on flow of SC-C2 and CS-C2a mortars with water-to-binder ratio of 0.375 with (a) SC-C2 (b) SC-C2a.

FIG. 21 shows compressive strength of 4"×8" cylinder under different condition for concrete mixes made with SC-C2 (top) and SC-C2a (bottom). (Dry and 24 hour soak is an average of 5 samples each and vacuum saturation test was conducted with 3 cylinders).

FIG. 22 shows milled clinker cement produced in a close circuit ball mill with a relatively narrow distribution.

FIG. 23 shows clinker milled to achieve a broad particle size with a reduced mean particle size vs. the commercially milled powder.

FIG. 24 shows clinker milled to achieve a broad particle size with in increased mean particle size vs. commercially milled powder.

FIG. 25 shows industrially milled cement (blue) compared with similar broad distributions milled to coarser and finer mean particle sizes.

DETAILED DESCRIPTION OF THE INVENTION

Figure 1:
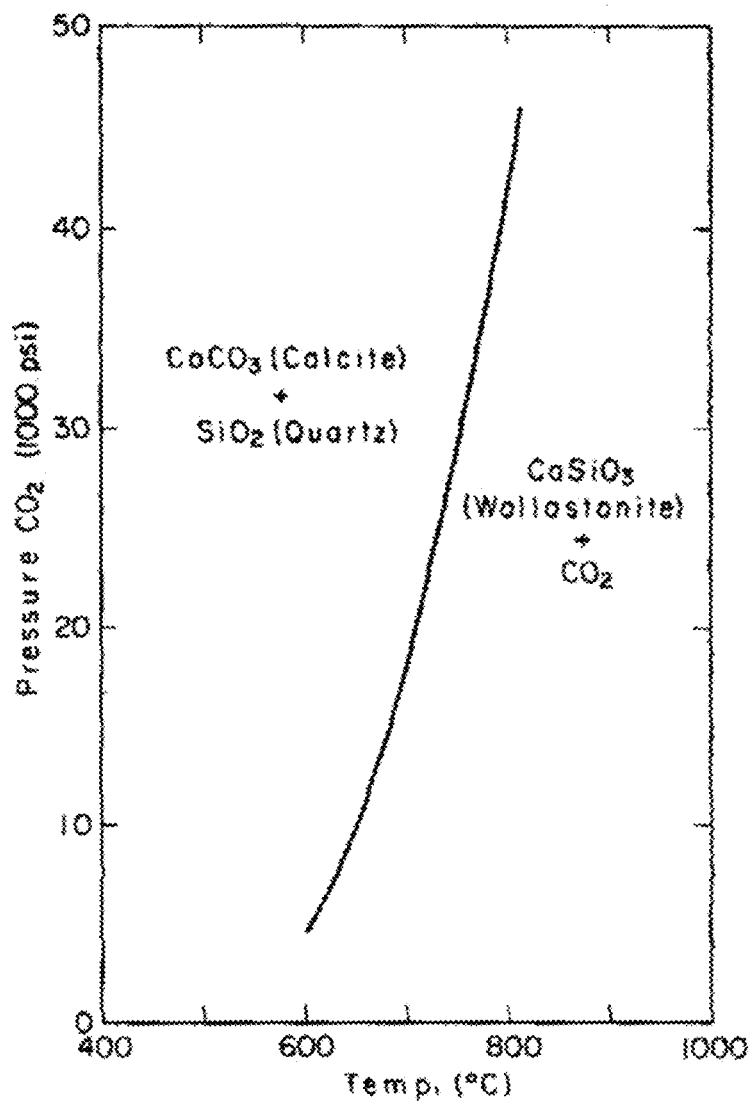
FIG. 1 is a pressure-temperature phase diagram showing the phases present in the reversible reaction $CaCO_3$+$SiO_2 \leftrightarrow CaSiO_3$ (calcium silicate)+$CO_2$.
Figure 2:
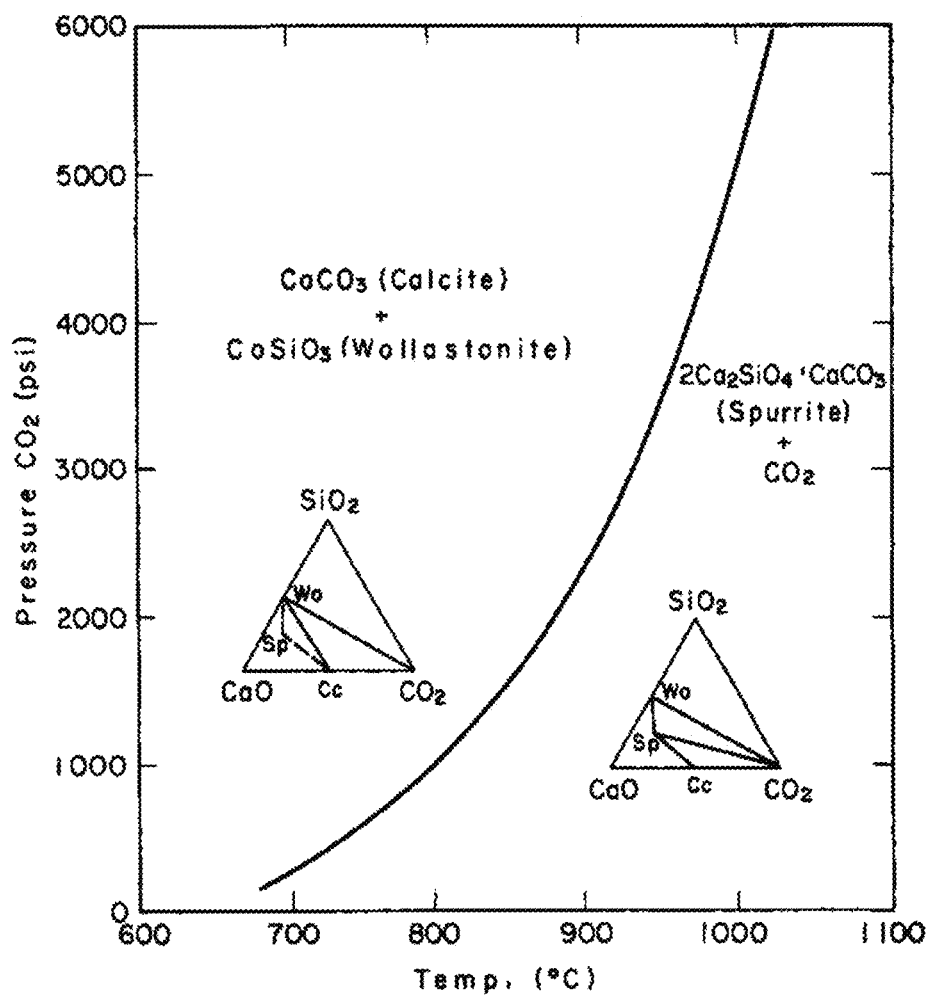
FIG. 2 is a pressure-temperature phase diagram showing the phases present in the reversible reaction $3CaCO_3$+$2CaSiO_3 \leftrightarrow 2Ca_2SiO_4.CaCO_3$+$CO_2$.
Figure 3:
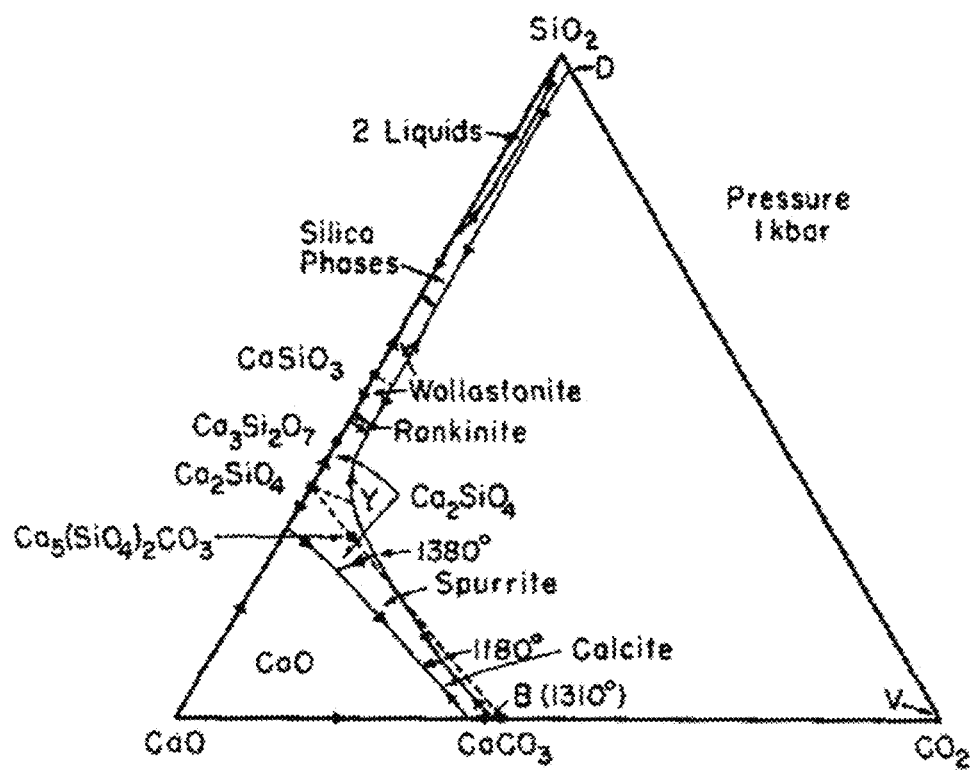
FIG. 3 is a phase diagram of the CaO—$SiO_2$—$CO_2$ system at a pressure of 1 kilobar.
Figure 4:
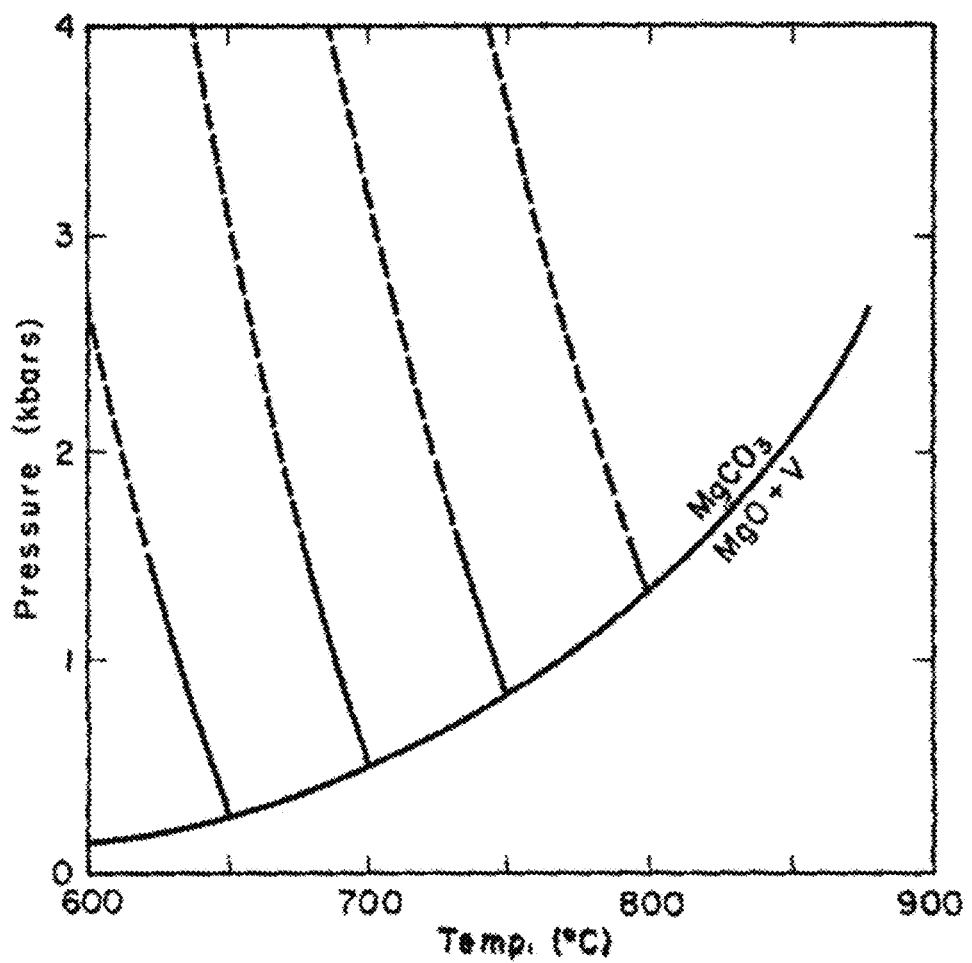
FIG. 4 is a pressure-temperature phase diagram showing the phases present in the reversible reaction MgO+ $CO_2 \leftrightarrow MgCO_3$.
Figure 5:
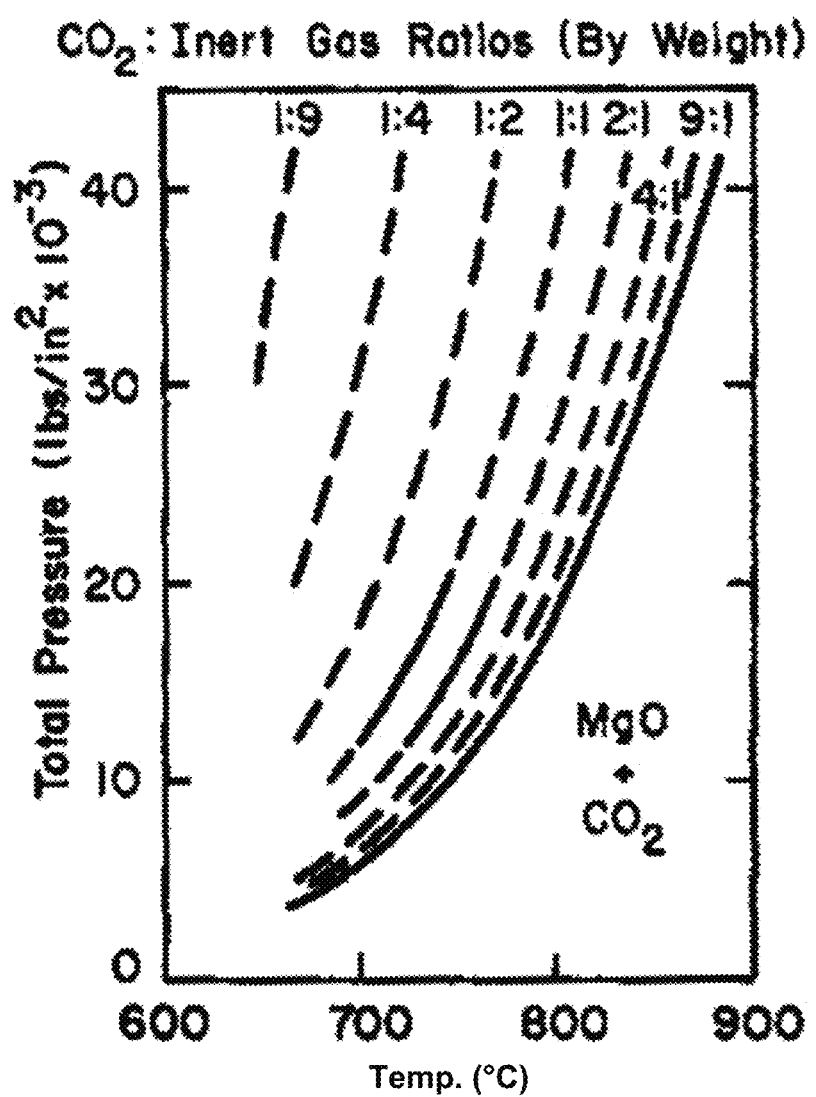
FIG. 5 is a pressure-temperature phase diagram showing the equilibrium curves for the reversible reaction MgO+ $CO_2 \leftrightarrow MgCO_3$ as a function of the proportion of $CO_2$ in an inert gas.
Figure 6:
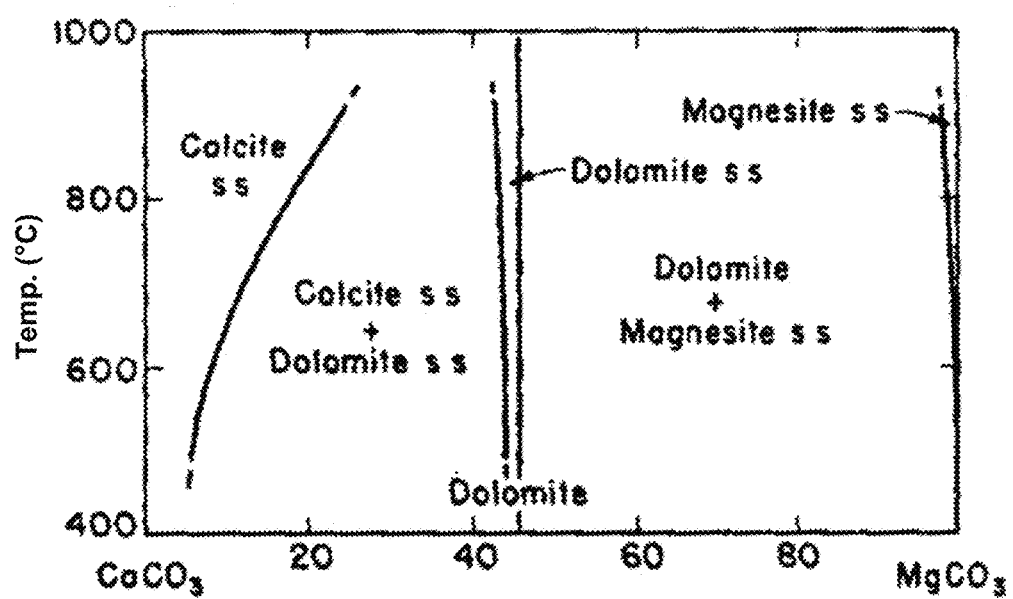
FIG. 6 is a temperature-composition phase diagram that illustrates the stability regions for various phases in the $CaCO_3$—$MgCO_3$ system.
Figure 7:
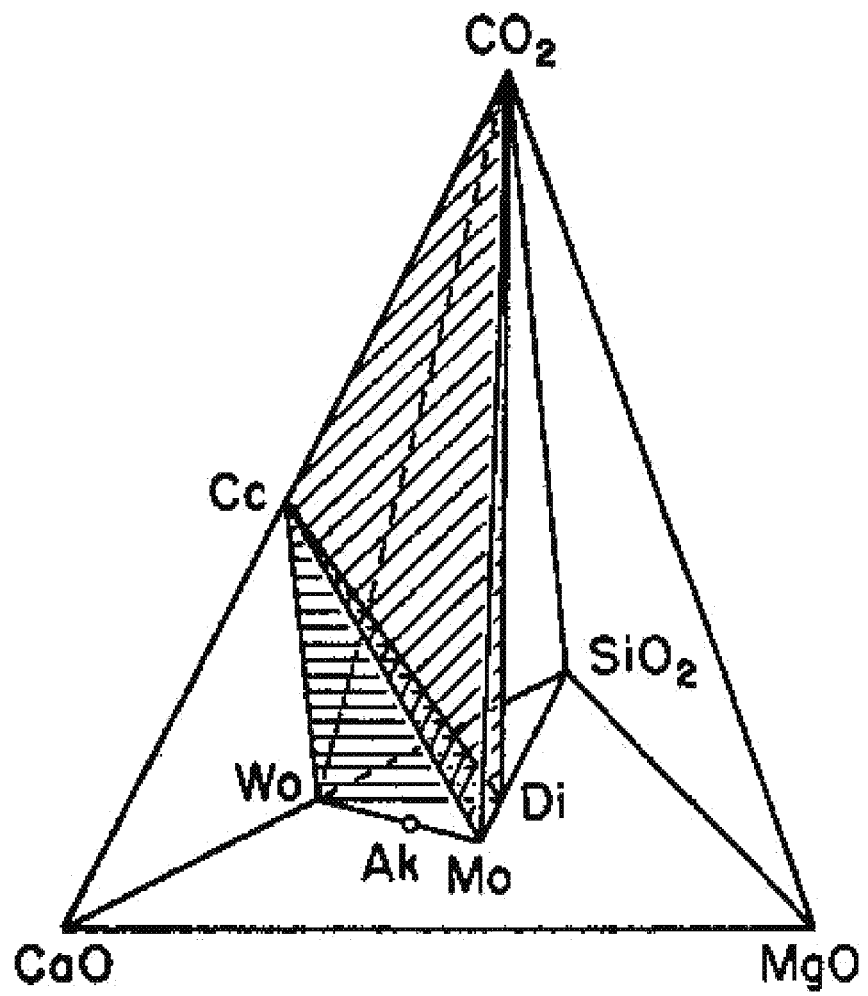
FIG. 7 is a tetrahedron diagram illustrating the phase relationships among the compounds CaO, MgO, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
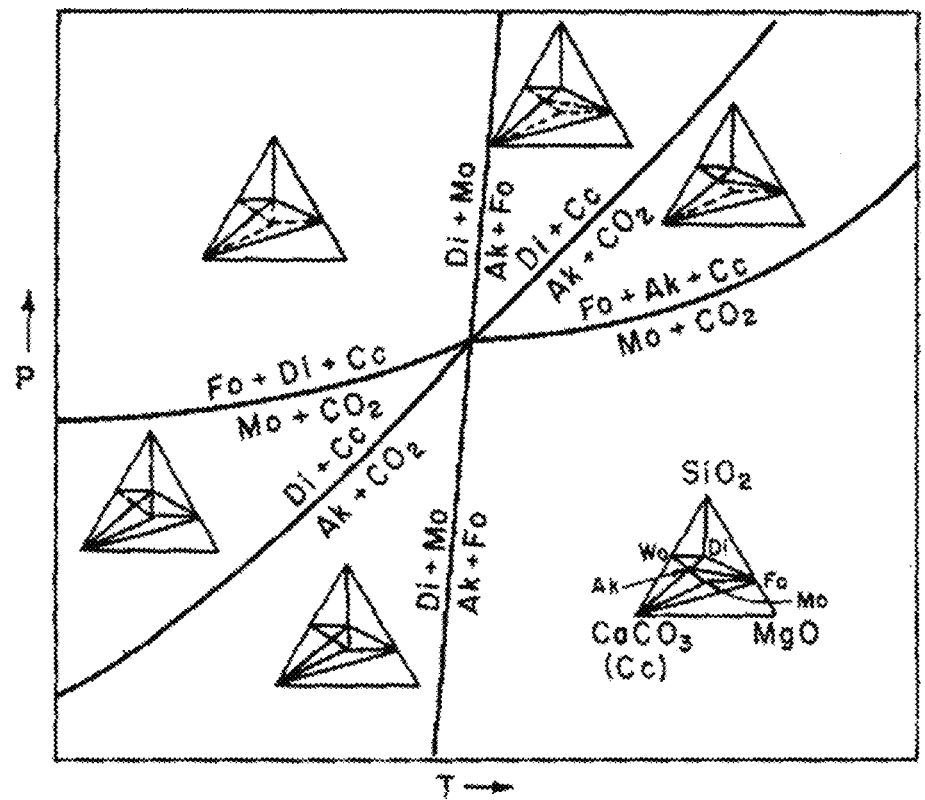
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound systems of $CaCO_3$, MgO and $SiO_2$.

The invention provides novel carbonatable calcium silicate compositions, a revolutionary replacement for conventional cement. These materials can be produced and utilized with significantly reduced energy requirement and $CO_2$ emissions. The disclosed carbonatable calcium silicate compositions are made from widely available, low cost raw materials by a process suitable for large-scale production with flexible equipment and production requirements. This unique approach also is accompanied with a remarkable proficiency for permanently and safely sequestration of $CO_2$. A wide variety of applications can benefit from the invention, from construction, pavements and landscaping, to infrastructure and transportation through improved energy consumption and more desirable carbon footprint.

In one aspect, the invention generally relates to the calcium silicate compositions and their chemistry. The composition includes various calcium silicates. The molar ratio of elemental Ca to elemental Si in the composition is from about 0.8 to about 1.2. The composition is comprised of a blend of discrete, crystalline calcium silicate phases, selected from one or more of CS (wollastonite or pseudo-wollastonite), C3S2 (rankinite) and C2S (belite or larnite or bredigite), at about 30% or more by mass of the total phases. The calcium silicate compositions are characterized by having about 30% or less of metal oxides of Al, Fe and Mg by total oxide mass, and being suitable for carbonation with $CO_2$ at a temperature of about 30° C. to about 90° C. to form $CaCO_3$ with mass gain of about 10% or more.

Calcium silicate compositions may contain amorphous (non-crystalline) calcium silicate phases in addition to the crystalline phases described above. The amorphous phase may additionally incorporate Al, Fe and Mg ions and other impurity ions present in the raw materials.

Each of these crystalline and amorphous calcium silicate phases is suitable for carbonation with $CO_2$.

The calcium silicate compositions may also include small quantities of residual CaO (lime) and $SiO_2$ (silica).

The calcium silicate composition may also include small quantities of C3S (alite, $Ca_3SiO_5$).

The C2S phase present within the calcium silicate composition may exist in any $\alpha$-$Ca_2SiO_4$, $\beta$-$Ca_2SiO_4$ or $\gamma$-$Ca_2SiO_4$ polymorph or combination thereof.

The calcium silicate compositions may also include quantities of inert phases such as melilite type minerals (melilite or gehlenite or akermanite) with the general formula $(Ca,Na,K)_2[(Mg, Fe^{2+},Fe^{3+},Al,Si)_3O_7]$ and ferrite type minerals (ferrite or brownmillerite or C4AF) with the general formula $Ca_2(Al,Fe^{3+})_2O_5$. In certain embodiments, the calcium silicate composition is comprised only of amorphous phases. In certain embodiments, the calcium silicate comprises only of crystalline phases. In certain embodiments, some of the calcium silicate composition exists in an amorphous phase and some exists in a crystalline phase.

In certain preferred embodiments, the molar ratio of elemental Ca to elemental Si of the calcium silicate composition is from about 0.80 to about 1.20. In certain preferred embodiments, the molar ratio of Ca to Si of the composition is from about 0.85 to about 1.15. In certain preferred embodiments, the molar ratio of Ca to Si of the composition is from about 0.90 to about 1.10. In certain preferred embodiments, the molar ratio of Ca to Si of the composition is from about 0.95 to about 1.05. In certain preferred embodiments, the molar ratio of Ca to Si of the composition is from about 0.98 to about 1.02. In certain preferred embodiments, the molar ratio of Ca to Si of the composition is from about 0.99 to about 1.01.

The metal oxides of Al, Fe and Mg contained within the calcium silicate composition are generally controlled to be less than about 30%. In certain preferred embodiments, the composition has about 20% or less of metal oxides of Al, Fe and Mg by total oxide mass. In certain preferred embodiments, the composition has about 15% or less of metal oxides of Al, Fe and Mg by total oxide mass. In certain preferred embodiments, the composition has about 12% or less of metal oxides of Al, Fe and Mg by total oxide mass. In certain preferred embodiments, the composition has about 10% or less of metal oxides of Al, Fe and Mg by total oxide mass. In certain preferred embodiments, the composition has about 5% or less of metal oxides of Al, Fe and Mg by total oxide mass.

Each of these calcium silicate phases is suitable for carbonation with $CO_2$. Hereafter, the discrete calcium silicate phases that are suitable for carbonation will be referred to as reactive phases.

The reactive phases may be present in the composition in any suitable amount. In certain preferred embodiments, the reactive phases are present at about 50% or more by mass. In certain preferred embodiments, the reactive phases are present at about 60% or more by mass. In certain preferred embodiments, the reactive phases are present at about 70% or more by mass. In certain preferred embodiments, the reactive phases are present at about 80% or more by mass. In certain preferred embodiments, the reactive phases are present at about 90% or more by mass. In certain preferred embodiments, the reactive phases are present at about 95% or more by mass.

The various reactive phases may account for any suitable portions of the overall reactive phases. In certain preferred embodiments, the reactive phases of CS are present at about 10 to about 60 wt % (e.g., about 15 wt % to about 60 wt %, about 20 wt % to about 60 wt %, about 25 wt % to about 60 wt %, about 30 wt % to about 60 wt %, about 35 wt % to about 60 wt %, about 40 wt % to about 60 wt %, about 10 wt % to about 50 wt %, about 10 wt % to about 40 wt %, about 10 wt % to about 30 wt %, about 10 wt % to about 25 wt %, about 10 wt % to about 20 wt %); C3S2 in about 5 to 50 wt % (e.g., about 10 wt % to 50 wt %, about 15 wt % to 50 wt %, about 20 wt % to 50 wt %, about 30 wt % to 50 wt %, about 40 wt % to 50 wt %, about 5 wt % to 40 wt %, about 5 wt % to 30 wt %, about 5 wt % to 25 wt %, about 5 wt % to 20 wt %, about 5 wt % to 15 wt %); and C2S in about 5 wt % to 60 wt % (e.g., about 10 wt % to about 60 wt %, about 20 wt % to about 60 wt %, about 25 wt % to about 60 wt %, about 30 wt % to about 60 wt %, about 35 wt % to about 60 wt %, about 40 wt % to about 60 wt %, about 5 wt % to about 50 wt %, about 5 wt % to about 40 wt %, about 5 wt % to about 30 wt %, about 5 wt % to about 25 wt %, about 5 wt % to about 20 wt %, about 5 wt % to about 20 wt %), and C in about 0 wt % to 3 wt % (e.g., 0 wt %, 1 wt % or less, 2 wt % or less, 3 wt % or less, about 1 wt % to 2 wt %, about 1 wt % to 3 wt %, about 2 wt % to 3 wt %).

In certain embodiments, the reactive phases comprise a calcium-silicate based amorphous phase, for example, at about 40% or more (e.g., about 45% or more, about 50% or more, about 55% or more, about 60% or more, about 65% or more, about 70% or more, about 75% or more, about 80% or more, about 85% or more, about 90% or more, about 95% or more) by mass of the total phases. It is noted that the amorphous phase may additionally incorporate impurity ions present in the raw materials.

The calcium silicate compositions of the invention are suitable for carbonation with $CO_2$. In particular, the composition of calcium silicate is suitable for carbonation with $CO_2$ at a temperature of about 30° C. to about 90° C. to form $CaCO_3$ with mass gain of about 20% or more. The mass gain reflects the net sequestration of $CO_2$ in the carbonated products. In certain preferred embodiments, the composition is suitable for carbonation with $CO_2$ at a temperature of about 30° C. to about 90° C. (e.g., about 40° C. to about 90° C., about 50° C. to about 90° C., about 60° C. to about 90° C., about 30° C. to about 80° C., about 30° C. to about 70° C., about 30° C. to about 60° C., about 40° C. to about 80° C., about 40° C. to about 70° C., about 40° C. to about 60° C.) to form $CaCO_3$ with mass gain of 10% or more (e.g., 15% or more, 20% or more, 25% or more, 30% or more).

In another aspect, the invention generally relates to a carbonated material that is produced from a calcium silicate composition disclosed herein.

In yet another aspect, the invention generally relates to a carbonatable calcium silicate composition in powder form having a mean particle size (d50) of about 8 µm to about 25 µm, with 10% of particles (d10) sized below about 0.1 µm to about 3 µm, and 90% of particles (d90) sized above about 35 µm to about 100 µm.

In certain embodiments, the ratio of d90:d10 is selected to allow improved powder flow or decreased water demand for casting. In certain embodiments, the ratio of d50:d10 is selected to allow improved reactivity, improved packing, or decreased water demand for casting. In certain embodiments, the ratio of d90:d50 is selected to allow improved the reactivity, improved packing, or decreased water demand for casting.

Any suitable calcium silicate composition may be used as a precursor for the bonding elements. As used herein, the term "calcium silicate composition" generally refers to naturally-occurring minerals or synthetic materials that are comprised of one or more of a group of calcium silicate phases including CS (wollastonite or pseudowollastonite, and sometimes formulated $CaSiO_3$ or $CaO.SiO_2$), C3S2 (rankinite, and sometimes formulated as $Ca_3Si_2O_7$ or $3CaO.2SiO_2$), C2S (belite, $\beta$-$Ca_2SiO_4$ or larnite, $\beta$-$Ca_2SiO_4$ or bredigite, $\alpha$-$Ca_2SiO_4$ or $\gamma$-$Ca_2SiO_4$, and sometimes formulated as $Ca_2SiO_4$ or $2CaO.SiO_2$), a calcium-silicate based amorphous phase, each of which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It is noted that preferably the carbonatable calcium silicate compositions of the invention do not hydrate. However, minor amounts of hydratable calcium silicate phases (e.g., C2S, C3S and CaO) may be present. C2S exhibits slow kinetics of hydration when exposed to water and is quickly converted to $CaCO_3$ during $CO_2$ curing processes. C3S and CaO hydrate quickly upon exposure to water and thus should be limited to <5% by mass.

The calcium silicate phases included in the calcium silicate composition do not hydrate when exposed to water. Due to this composites produced using a calcium silicate composition as the binding agent do not generate significant strength when combined with water. The strength generation is controlled by exposure of calcium silicate composition containing composites to specific curing regimes in the presence of $CO_2$.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite") and $Mg_3Si_4O_{10}(OH)_2$ (also known as "talc") and $CaMgSiO_4$ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

A major utility of the carbonatable composition of the invention is that it can be carbonated to form composite materials that are useful in a variety of application. The carbonation, for example, may be carried out reacting it with $CO_2$ via a controlled Hydrothermal Liquid Phase Sintering (HLPS) process to create bonding elements that hold together the various components of the composite material. For example in preferred embodiments, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. patent application Ser. Nos. 14/045,758, 14/045,519, 14/045,766, 14/045,540, all filed Oct. 3, 2013, U.S. patent application Ser. Nos. 14/207,413, 14/207,421, filed Mar. 12, 2014, U.S. patent application Ser. Nos. 14/207,920, 14/209,238, filed Mar. 13, 2014, U.S. patent application Ser. Nos. 14/295,601, 14/295,402, filed Jun. 4, 2014, each of which is expressly incorporated herein by reference in its entirety for all purposes.

Figure 9:
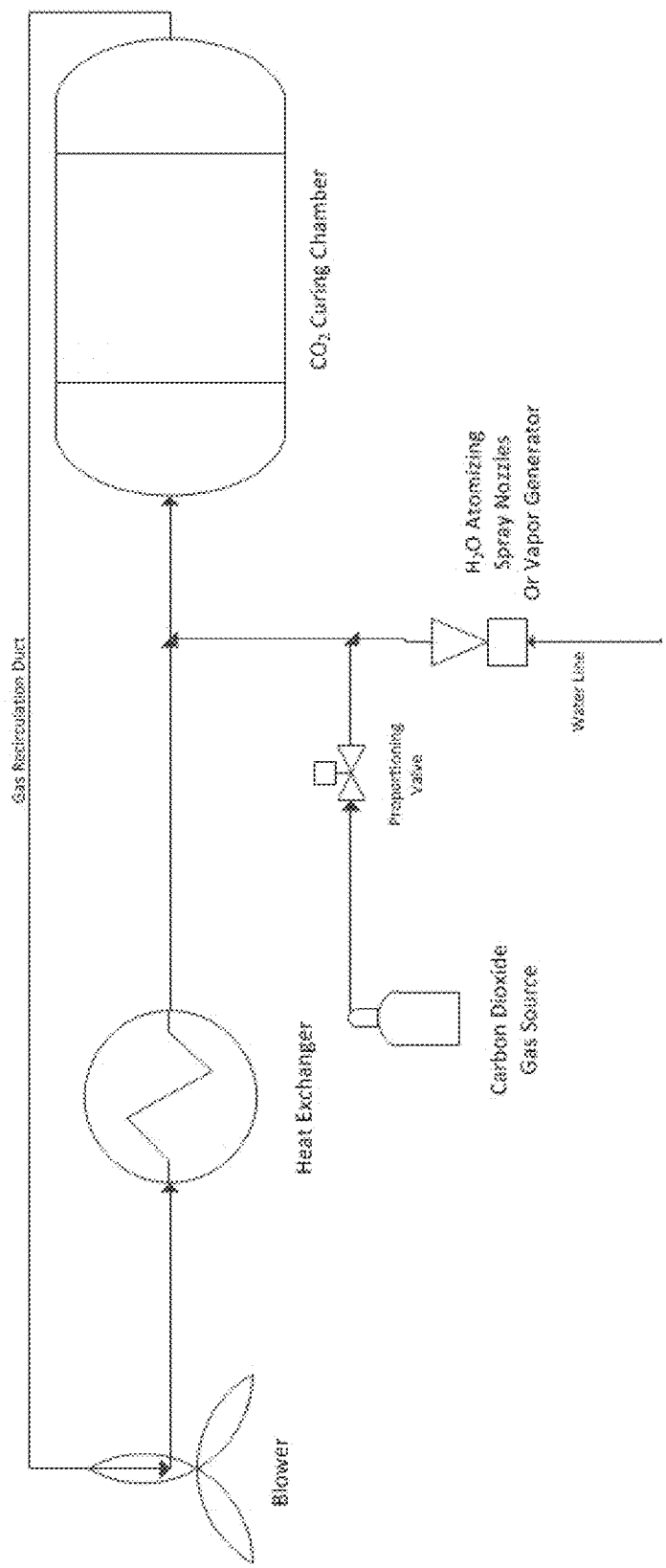
FIG. 9 is a schematic diagram of a $CO_2$ composite material curing chamber that provides humidification according to principles of the invention.
Figure 10:
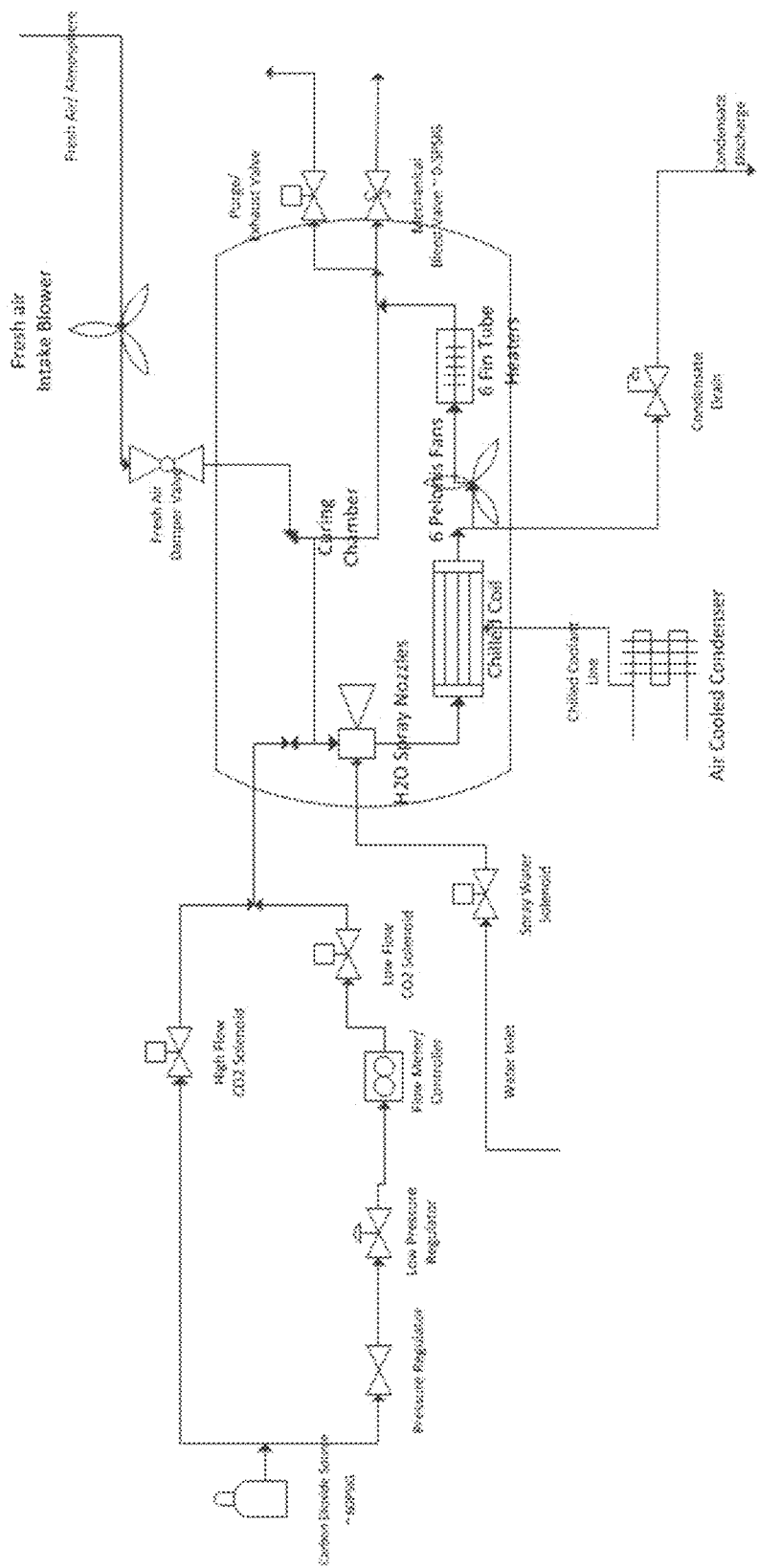
FIG. 10 is a schematic diagram of a curing chamber with multiple methods of humidity control as well as ability to control and replenish $CO_2$ using constant flow or pressure regulation and that can control the temperature according to principles of the invention.

FIG. 1 through FIG. 8 are phase diagrams that show various phase interrelationships among some of the materials described. FIG. 9 is a schematic diagram of a $CO_2$ composite material curing chamber that provides humidification according to principles of the invention. In FIG. 9, a water supply is provided and water vapor is added to the atmosphere that is circulating within the curing chamber. FIG. 10 is a schematic diagram of a curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value.

In exemplary embodiments of carbonation of the composition of the invention, ground calcium silicate composition is used. The ground calcium silicate composition may have a mean particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 $m^2$/kg to about 700 $m^2$/kg (e.g., 150 $m^2$/kg, 200 $m^2$/kg, 250 $m^2$/kg, 300 $m^2$/kg, 350 $m^2$/kg, 400 $m^2$/kg, 450 $m^2$/kg, 500 $m^2$/kg, 550 m2/kg, 600 m2/kg, 650 m2/kg, 700 m2/kg).

Any suitable aggregates may be used to form composite materials from the carbonatable composition of the invention, for example, calcium oxide-containing or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the composite material; for example, plasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

A variety of composite products can be produced from the carbonatable calcium silicate compositions of the invention by a process that does not require autoclave(s) and is suitable for continuous, large-scale production. The production methods are much improved over conventional pervious concretes in terms of both economics and environmental impact.

Examples

Carbonatable Calcium Silicate Compositions and Phases

NYAD 400, a mineral wollastonite product ($CaSiO_3$, NYCO minerals) was subjected to a $CO_2$ curing regime in a custom made reactor to demonstrate the ability of this composition to be carbonated. The reactor was a 39 liter, sterilizing vessel that consists of a stainless steel tank with a resistive heating element submerged in water. The lid to the vessel is machined to allow the injection and venting of $CO_2$ gas. The lid of the vessel also contains a fan that may be controlled by an external stirring device. Samples were reacted on a wire tray above the level of water and underneath a metal cone to prevent random droplets of water from interfering with the process. The samples were carbonated by reaction at 60° C. under a stirred $CO_2$ atmosphere that was partially saturated with water. The samples were allowed to react for varying lengths of time and analyzed to determine their mass gain from $CO_2$ exposure. The results of these experiments are displayed in FIG. 11.

Synthesis of Calcium Silicate Compositions from Limestone, Clay and Sand in Experimental Rotary Kiln Natural sources of limestone, clay and sand were used to synthesize calcium silicate compositions in a direct-fired rotary kiln. Three different raw materials mixes were ground to a mean particle size (d50) of ~30 μm. These mixtures are described in Table 2. The "mill setting" in Table 2 indicates if the raw material mixtures were ground together or blended following milling of the individual component materials.

TABLE 2

Raw material mixtures prepared for rotary kiln trials

| Mixture name | Mix 1T | Mix 2S | Mix 2T |
| --- | --- | --- | --- |
| Limestone (%) | 50 | 50 | 50 |
| Clay (%) | 50 | 30 | 30 |
| Sand (%) | | 20 | 20 |
| Mill setting | Together | Separate | Together |

Following the grinding of the raw materials, a granulation process was employed to allow for proper material flow in the pilot rotary kiln.

The granulated raw material was fed into a natural gas fired rotary kiln with dimensions and operating parameters described in Table 3. The calcium silicate compositions created in the rotary kiln emerged in "clinker" form, that is, in small granules approximately 1 to 4 mm in diameter. The clinker was ground to a powder with a mean particle size (d50) of approximately 12 μm prior to analysis.

TABLE 3

Operation and kiln parameters for the cement synthesis trial

| Kiln parameter | Value |
| --- | --- |
| Dimensions | 0.3 m by 7 m |
| Inclination | 1.5° |
| Speed | 4 rpm |
| Feed rate | 30 kg/h |
| Residence time | 30-75 minutes |
| Temperature | 1,050-1,250° C. |

Samples of the ground clinker were subjected to a $CO_2$ curing regime in a custom made reactor. The samples were carbonated at 60° C. under a stirred $CO_2$ atmosphere while partially saturated with water. The samples were allowed to react for varying lengths of time and analyzed to determine their mass gain from $CO_2$ exposure. The results of these experiments are displayed in FIG. 12.

Table 4 lists X-Ray diffraction (XRD) quantification of mineralogical phases present in ground clinker (Sample 12; as-is) and of the ground clinker subjected to the $CO_2$ curing regime. (Sample 12; Carbonated (20 hours)). Sample 12 refers to the limestone, clay, sand blend 2T fired at a peak kiln temperature of ~1220° C. Quantification was done by Reitveld refinement of the collected data.

TABLE 4

X-Ray diffraction quantification of mineralogical phases in the as-is and carbonated calcium silicate composition

| | | Sample 12 (XRD mass %) | |
| --- | --- | --- | --- |
| Phase | Stochiometry | as-is | Carbonated (20 hours) |
| Pseudowollastonite | $CaSiO_3$ | 30.0 | 4.1 |
| Wollastonite 1 A | $CaSiO_3$ | 2.0 | |
| Rankinite | $Ca_3Si_2O_7$ | 5.9 | |
| Belite | $Ca_2SiO_4$ | 11.9 | |
| Lime | CaO | 1.4 | |
| Portlandite | $Ca(OH)_2$ | 6.6 | |
| Gehlenite | $Ca_2Al_2SiO_7$ | 24.8 | 16.4 |
| Quartz | $SiO_2$ | 14.8 | 18.2 |
| Cristobalite | $SiO_2$ | 2.5 | 3.6 |
| Calcite | $CaCO_3$ | | 42.3 |
| Aragonite | $CaCO_3$ | | 13.7 |
| Vaterite | $CaCO_3$ | | 1.7 |

Synthesis of Calcium Silicate Compositions from Pure Chemical Reagents in Box Furnace Synthesized calcium silicate compositions were also produced from pure chemical reagents to ascertain the calcium silicate phases formed and their behavior upon carbonation. Samples were synthesized with 60 g $SiO_2$ (fumed silica from Evonik Industries, Aerosil 98) and 100 g of $CaCO_3$ (Sigma Aldrich, C6763). The components were proportioned to obtain a bulk stoichiometry of $CaSiO_3$ after calcination. The components were mixed and rolled in a PTFE container with water to granulate. The wet granules were then dried in a convection oven and fired in a box furnace (Sentro Tech, ST-1500C-121216) to 1,200° C. at a heating rate of 10° C./minute and held at the peak temperature for 1 hour. The calcium silicate compositions were then milled (Retch, PM100) and carbonated at 60° C. under a stirred $CO_2$ atmosphere while partially saturated with water. The milled calcium silicate compositions and the carbonated calcium silicate compositions were analyzed by XRD. The XRD data, displayed in FIG. 13a indicates the development of all three crystalline carbonatable species (wollastonite/pseudo-wollastonite, rankinite, larnite) even in a mixture with a bulk chemistry of $CaSiO_3$. FIG. 13b indicates the presence of carbonated species calcite, aragonite and vaterite after curing in $CO_2$.

Synthesis of Calcium Silicate Compositions from Siliceous Limestone in Box Furnace A naturally sourced siliceous limestone was used to ascertain the calcium silicate phases formed at high temperatures from an impure, naturally sourced material. The limestone naturally possess a molar ratio of elemental Ca to elemental Si (Ca:Si) of 1.12 and thus could act as a sole raw material for the synthesis of calcium silicate compositions. The chemistry of the limestone is shown in Table 5.

TABLE 5

The oxide composition of the example siliceous limestone, after ignition at 1000° C.

| Oxide | $SiO_2$ | $Al_2O_3$ | $Fe_2O_3$ | CaO | MgO | $SO_3$ | $K_2O$ | $Na_2O$ | $TiO_2$ | $P_2O_5$ |
|---|---|---|---|---|---|---|---|---|---|---|
| Mass % | 42.30% | 5.25% | 2.25% | 43.87% | 3.25% | 0.99% | 1.20% | 0.41% | 0.30% | 0.15% |

The limestone was ground into a powder and then granulated. The granulated material was fired in a box furnace to temperatures between 1,000° C. and 1,250° C. at 10° C./minute with 3 hour holds. The product of furnace experiments was ground into a powder and analyzed with XRD to quantify the development of carbonatable calcium silicate phases. X-Ray diffraction quantification results on siliceous limestone calcined at different temperatures are show in Table 6 and FIGS. 15a-15c.

TABLE 6

X-Ray diffraction quantification results on siliceous limestone

| Phase | Stochiometry | 1,000° C. | 1,100° C. | 1,200° C. |
|---|---|---|---|---|
| Pseudowollastonite | $CaSiO_3$ | 3.5 | | 42.4 |
| Wollastonite 1 A | $CaSiO_3$ | 5.3 | 15.4 | 1.4 |
| Belite | $Ca_2SiO_4$ | 29.5 | 32.3 | |
| Lime | CaO | 6.4 | 2.4 | |
| Gehlenite | $Ca_2Al_2SiO_7$ | 28.1 | 28.0 | 51.7 |
| Quartz | $SiO_2$ | 23.1 | 12.1 | 1.9 |
| Cristobalite | $SiO_2$ | | | 1.9 |
| Grossular | $Ca_3Al_2Si_3O_{12}$ | 1.7 | 4.5 | 0.6 |
| Periclase | MgO | 2.2 | 1.8 | |

Following these experiments, a large quantity of this limestone was prepared and processed as described previously in the box furnace at 1,150° C. The material was then milled to a powder with a mean particle size (d50) of approximately 12 µm and incorporated into a concrete mix. This mix was formed by vibratory casting into 4"×8" cylinders. The cylinders were carbonated at 60° C. in a $CO_2$ environment. Following the curing, the compressive strength of the samples was tested. The concrete samples displayed an average strength of 10,818±872 psi. The design of the concrete is shown in Table 7.

TABLE 7

Mix design of experimental concrete

| Component | Composition (by mass) |
|---|---|
| Calcined siliceous cement | 18% |
| Construction sand | 31% |
| ¼" Aggregate | 25% |
| ⅜" Aggregate | 26% |
| Water to cement ratio | 0.311 |
| Water reducing admixture | 10 ml/kg of cement |

Preparation and Carbonation of Amorphous Calcium Silicate Phases

In addition to the carbonation of crystalline calcium silicate phases, it is also possible to carbonate calcium silicate in an amorphous state. A synthetic calcium silicate composition was produced by the firing of high purity limestone and high purity sand at 1500° C. The resultant material was milled to a powder with a mean particle size (d50) of approximately 12 µm. This calcium silicate composition demonstrates a Ca:Si molar ratio of 1.08 as measured by X-ray fluorescence (Table 8), making it similar to the calcium silicate compositions described in the previous examples. Yet the XRD pattern of this calcium silicate composition, shown in FIG. 16, reveals that it is largely amorphous (>95% amorphous by Reitveld refinement).

The composition carbonated by reaction at 60° C. under a stirred $CO_2$ atmosphere that was partially saturated with water. After 18 hours of carbonation, the sample saw a mass gain of 25% despite its lack of significant crystalline calcium silicate phases.

TABLE 8

The oxide composition of synthetic high temperature wollastonite cement by XRF

| Oxide | $SiO_2$ | $Al_2O_3$ | $Fe_2O_3$ | CaO | MgO | $SO_3$ | $K_2O$ | $Na_2O$ | $TiO_2$ | $P_2O_5$ | MnO | SrO | $ZrO_2$ |
|---|---|---|---|---|---|---|---|---|---|---|---|---|---|
| Mass % | 47.12 | 2.11 | 0.25 | 47.68 | 1.5 | 0.22 | 0.41 | 0.21 | 0.1 | 0.33 | 0.02 | 0.04 | 0.01 |

Preparation and Carbonation of $Al_2O_3$-Containing Amorphous Calcium Silicate Compositions with a Ca:Si Molar Ratio of 1:1

Amorphous calcium silicate compositions containing $Al_2O_3$ were prepared from chemical grade reagents to verify their carbonation potential. Samples were made from 60 g of $SiO_2$ (Min-u-sil 5, US Silica), 100 g of $CaCO_3$ (Sigma Aldrich, C6763) and varying amounts of $Al(OH)_3$ (Sigma Aldrich, 239186). The raw materials were hand mixed and fired to 1,600° C. at 10° C./minute in a bottom loading furnace (Sentro Tech, ST-1600C-101012-BL). After a one-hour hold at maximum temperature, the material was removed from the furnace and immediately quenched by pouring onto a steel plate. The resulting amorphous calcium silicate compositions were milled into a powder with a mean particle size (d50) of 12 μm and carbonated for 20 hours at 60° C. under a stirred $CO_2$ atmosphere while partially saturated with water. The calcium silicate composition samples were analyzed by XRD before and after carbonation to determine their crystallinity and identify carbonation products. The results of these experiments are summarized in Table 9. A comparison of the XRD pattern obtained for sample 1 before and after carbonation is shown in FIG. 17.

TABLE 9

Wollastonite glass samples prepared by furnace melting and quenching on steel plate

| Sample | CaO | $SiO_2$ | $Al_2O_3$ | Mass gain[a] |
|---|---|---|---|---|
| 1 | 48.0% | 51.4% | 0.6% | 18.0% |
| 2 | 47.0% | 50.4% | 2.6% | 29.0% |
| 3 | 45.9% | 49.1% | 5.0% | 25.5% |
| 4 | 44.7% | 47.8% | 7.5% | 15.0% |
| 5 | 43.4% | 46.6% | 10.0% | 12.0% |

[a]Oxide composition in mass %. Mass gain after a 20 hour reaction at 60° C. in a $CO_2$ atmosphere is also reported.

Synthesis and Carbonation of Calcium Silicates with Various Impurity Inclusions

Calcium silicates were prepared by mixing chemical grade reagents in various proportions to obtain samples with a Ca:Si molar ratio of 1:1 having a range of $Al_2O_3$, $Fe_2O_3$, and MgO impurities to determine the effect of these impurities on the calcium silicate composition. $CaCO_3$ (Sigma Aldrich, C6763), $SiO_2$ (U.S. Silica, Min-u-sil 5), $Al(OH)_3$ (Sigma Aldrich, 239186), $Fe_2O_3$ (Fisher Scientific, 1116) and $MgCO_3$ (Sigma Aldrich, 342793) were used in the synthesis of the samples. A description of the impurity levels in these samples is shown in Table 10. The samples were prepared and mixed by hand and pressed using to a hydraulic press into 1" diameter pellets. The pellets were fired in a box furnace to temperatures between 1150° C. and 1250° C. at 10° C./min with a 1 hour hold. Following firing, the samples were milled to a powder. The milled cements were analyzed by X-Ray diffraction. The results of the XRD analysis are shown in Table 11 for the 1150° C. samples and Table 12 for the 1250° C. samples.

TABLE 10

Calculated impurity content of samples produced with a Ca:Si molar ratio of 1.0

| | Resultant Oxides, wt. % | | |
|---|---|---|---|
| Sample | $Al_2O_3$ | $Fe_2O_3$ | MgO |
| IS-1 | 0.57 | 0.03 | 0.02 |
| IS-2 | 0.56 | 2.50 | 0.02 |
| IS-3 | 0.55 | 5.00 | 0.01 |
| IS-4 | 0.52 | 10.00 | 0.01 |
| IS-5 | 2.50 | 0.03 | 0.02 |
| IS-6 | 5.00 | 0.03 | 0.01 |
| IS-7 | 10.00 | 0.03 | 0.01 |
| IS-8 | 0.55 | 0.03 | 2.50 |
| IS-9 | 0.55 | 0.03 | 5.00 |
| IS-10 | 0.52 | 0.03 | 10.00 |
| IS-11 | 2.50 | 2.50 | 2.50 |
| IS-12 | 5.00 | 2.50 | 2.50 |
| IS-13 | 2.50 | 5.00 | 2.50 |
| IS-14 | 2.50 | 2.50 | 5.00 |

TABLE 11

XRD phase quantification of IS samples fired to 1150° C.

| Phase | IS-1 (%) | IS-2 (%) | IS-3 (%) | IS-4 (%) | IS-5 (%) | IS-6 (%) | IS-7 (%) | IS-8 (%) | IS-9 (%) | IS-10 (%) | IS-11 (%) | IS-12 (%) | IS-13 (%) | IS-14 (%) |
|---|---|---|---|---|---|---|---|---|---|---|---|---|---|---|
| Belite-β $Ca_2SiO_4$ | 63.1 | 49.2 | 41.3 | 45.7 | 57.1 | 59.1 | 49.9 | 56.2 | 30.4 | 44.3 | 46.8 | 50.3 | 49.2 | 47.9 |
| $Ca_2SiO_4$-γ | | 9.8 | 6.1 | 6.5 | 1.9 | | | | | | | 1.10 | 4.50 | 4.20 |
| Pseudowollastonite $CaSiO_3$ | 4 | 13.1 | 26.3 | 18.5 | 0.7 | | | | | | | | | |
| Wollastonite-2M $CaSiO_3$ | 4.8 | 3.1 | 2.9 | 2.1 | 1.2 | 3.7 | 4.6 | 2.0 | | | 19.3 | 13.3 | 24.5 | 16.9 |
| Rankinite $Ca_3Si_2O_7$ | | | | | | | | | | | 6.1 | | | |
| Quartz $SiO_2$ | 27.9 | 21.8 | 19.3 | 19.3 | 31.4 | 30.1 | 30.2 | 32.7 | 31.8 | 37.0 | 17.4 | 19.4 | 13.7 | 20.5 |
| Cristobalite $SiO_2$ | 0.1 | 0.5 | 1.5 | 1.2 | 0.3 | 0.5 | 2.8 | | | | 2.9 | 3.3 | 5.7 | 4.1 |
| Lime CaO | | | | | | | 1.0 | 0.4 | 27.6 | 4.3 | | | | |
| Portlandite $Ca(OH)_2$ | | | | | 5.1 | 5.8 | 10.8 | 7.2 | | | 3.7 | | | |
| Hematite $Fe_2O_3$ | | 2.5 | 2.7 | 6.7 | 2.2 | 0.9 | 0.7 | | | | 1.6 | 1.2 | 1.5 | |
| Periclase MgO | | | | | | | | 1.4 | 2.9 | 6.2 | 0.6 | | | 2.1 |
| Grossular $Ca_3Al_2(SiO_4)_3$ | | | | | | | | | | | | 0.5 | 1.2 | 2.7 |
| Brownmillerite $Ca_2Fe_2O_5$ | | | | | | | | | 7.3 | 8.3 | 3.0 | | | |
| Gehlenite $Ca_3Al_2SiO_7$ | | | | | | | | | | | | 3.9 | 6.8 | |

TABLE 12

XRD phase quantification of IS samples fired to 1250° C.

| Phase | IS-1 (%) | IS-2 (%) | IS-3 (%) | IS-4 (%) | IS-5 (%) | IS-6 (%) | IS-7 (%) | IS-8 (%) | IS-9 (%) | IS-10 (%) | IS-11 (%) | IS-12 (%) | IS-13 (%) | IS-14 (%) |
|---|---|---|---|---|---|---|---|---|---|---|---|---|---|---|
| Belite-β $Ca_2SiO_4$ | 73.9 | 7.6 | 7.9 | 7.0 | 57.7 | 56.9 | 41.8 | 55.0 | 22.3 | 45.0 | 20.4 | 26.6 | 7.4 | 6.1 |
| $Ca_2SiO_4$-γ | | 43.0 | 14.7 | 6.9 | 4.7 | 4.3 | 8.5 | 2.0 | 2.3 | 3.9 | 7.9 | 5.9 | 2.6 | 19.3 |
| Pseudowollastonite $CaSiO_3$ | | 9.9 | 18.2 | 22.0 | 3.6 | 3.9 | 3.8 | 3.4 | 2.8 | 0.5 | 26.6 | 21.6 | 42.6 | 24.9 |
| Wollastonite-2M $CaSiO_3$ | | | | | | 1.0 | 1.3 | 1.6 | 1.3 | | 2.5 | 1.8 | 2.8 | 3.5 |
| Rankinite $Ca_3Si_2O_7$ | | 18.5 | 42.8 | 50.4 | | | | | | | 12.8 | 4.6 | 20.7 | 7.1 |
| Quartz $SiO_2$ | 25.3 | 15.0 | 9.6 | 3.9 | 27.4 | 27.4 | 25.6 | 28.2 | 41.8 | 27.5 | 9.1 | 10.2 | 4.1 | 10.1 |
| Cristobalie $SiO_2$ | 0.8 | 6.0 | 6.7 | 9.9 | 1.9 | 2.8 | 8.5 | 1.5 | 4.9 | 2.0 | 5.2 | 7.6 | 4.9 | 5.2 |
| Lime CaO | | | | | 0.2 | | 2.1 | 3.5 | 14.5 | 7.9 | | 0.1 | | |
| Portlandite $Ca(OH)_2$ | | | | | 3.1 | 2.2 | 1.3 | 2.8 | 4.3 | 4.9 | 1.0 | 1.6 | | |
| Hematite $Fe_2O_3$ | | | | | | | | | | | | | | 1.3 |
| Periclase MgO | | | | | 0.5 | | | 1.6 | 2.8 | 8.0 | | | | 0.4 |
| Grossular $Ca_3Al_2(SiO_4)_3$ | | | | | | | | | | | | | | |
| Brownmillerite $Ca_2Fe_2O_5$ | | | | | | | | | | | | | | |
| Gehlenite $Ca_3Al_2SiO_7$ | | | | | 0.9 | 1.5 | 1.5 | 0.4 | 3.0 | 0.3 | 14.7 | 20.0 | 15.0 | 22.2 |
| Tricalcium aluminate $Ca_3Al_2O_6$ | | | | | | | 5.6 | | | | | | | |

Synthesis and Carbonation of Calcium Silicates of Various Ca:Si Molar Ratios

Calcium silicates were prepared by mixing chemical grade reagents in various proportions to obtain samples with a Ca:Si molar ratio varying from 0.8 to 1.2 to determine the effect and calcium silicate composition. $CaCO_3$ (Sigma Aldrich, C6763) and $SiO_2$ (U.S. Silica, Min-u-sil 5) were used in the synthesis of the samples. The samples were prepared and mixed by hand and pressed using to a hydraulic press into 1" diameter pellets. The pellets were fired in a box furnace to 1250° C. at 10° C./min with a 1 hour hold. Following firing, the samples were milled to a powder. The milled cements were analyzed by X-Ray diffraction, shown in Table 13.

TABLE 13

XRD phase quantification of samples with a Ca:Si molar ratio between 0.8-1.2

| Phase | CR-0.8 (%) | CR-0.9 (%) | CR-1.0 (%) | CR-1.1 (%) | CR-1.2 (%) |
|---|---|---|---|---|---|
| Ca:Si Molar Ratio | 0.8 | 0.9 | 1.0 | 1.1 | 1.2 |
| Belite-β $Ca_2SiO_4$ | 35.7 | 13.7 | 57.2 | 58.1 | 51.6 |
| $Ca_2SiO_4$-γ | 14.4 | 0.3 | 9.0 | 1.3 | |
| Rankinite $Ca_3Si_2O_7$ | | | | | 3.8 |
| Pseudowollastonite $CaSiO_3$ | 14.2 | 31.1 | 4.5 | 2.7 | 2.3 |
| Quartz $SiO_2$ | 33.3 | 48.1 | 27.1 | 30.1 | 26.3 |
| Cristobalie $SiO_2$ | | 6.9 | 1.0 | 1.0 | 0.7 |
| Lime CaO | 0.2 | | | | 1.9 |
| Portlandite $Ca(OH)_2$ | 0.5 | | 1.3 | 6.8 | 13.3 |

Particle Size Distribution Statistics

FIGS. 18 and 19 show the particle size distribution profiles of the two calcium silicate compositions milled to produce a narrow and broad particle size distribution. SC-C2 was produced by jet milling of a coarsely milled powder and SC-C2a was produced by ball milling of a coarsely milled powder.

TABLE 14

Particle size distribution statistics of SC-C2 and SC-C2a cements.

| | Particle statistics | | |
|---|---|---|---|
| | d10 (μm) | d50 (μm) | d90 (μm) |
| SC-C2 | 2.02 | 10.27 | 19.89 |
| SC-C2a | 2.04 | 12.53 | 31.70 |

The packing characteristics of the SC-C2 and SC-2Ca powders were measured by flow tests performed on mortars. The mortars were produced by mixing the experimental calcium silicate composition with ASTM C109 standard sand (Humbolt Manufacturing, H-3825) with a ratio of calcium silicate composition to sand of 1:3 by mass and a ratio of water to calcium silicate composition of 0.375 by mass. The flow of the mortar after 20 taps on a motorized flow table was measured. FIG. 20 shows the significant improvement of flow property of mortar prepared with SC-C2a. This result indicates that mixtures prepared with broad SC-C2a will require less water to achieve a desired flow behavior than comparable concretes made with narrow SC-C2.

Concrete cylinders of dimensions 4'D×8"H were prepared to measure the compressive strength of carbonated concretes in dry and water saturated states. The dry components of the concrete samples were mixed in the proportions listed in Table 15.

TABLE 15

Mixture design for solid component used for concrete cylinders

| | Mass % |
|---|---|
| SC-C2, SC-C2a | 18% |
| Construction sand | 39% |
| ¼" aggregate | 21% |
| ⅜" aggregate | 22% |

Glenium 7500 (BASF) was used as a water-reducing admixture to help disperse the calcium silicate composition at low water-to-calcium silicate composition ratios. A dosage of 10 mL/Kg of binder was used for all mixtures. A water-to-calcium silicate composition ratio of 0.271 was used.

The concrete cylinder were subjected to curing under high concentration of $CO_2$ at 60° C. The resulting concrete cylinders were tested in both the dry and wet states as per ASTM C-39 where applicable. For the water saturated testing, the cylinders were soaked for 24 hours in water to saturate the microstructure with water. Additionally, the SC-C2a samples were subjected to a 24 hour vacuum saturation to ensure full saturation of the microstructure. The results of the testing indicate an enhanced compressive strength for the sample produced with the broad SC-C2a calcium silicate composition (FIG. 21). It is also seen that the relative change in compressive strength upon saturation of the sample with water is diminished when a broadly distributed calcium silicate composition is used.

SC-L—Super Broad Distribution

FIG. 22 shows the particle size distribution profile for a calcium silicate composition clinker that was milled in an industrial closed circuit ball mill to achieve a target particle size distribution. The same clinker used to produce this calcium silicate composition was milled in batch ball mills with a different charge of media to produce a broad particle size with a higher mean particle size (d50) in the case of FIG. 23, and a broad particle size (d50) in the case of FIG. 24. The distributions are superimposed in FIG. 25.

TABLE 16

General particle size statistics describing type I,
type III and a hypothetical broadly distributed cement

| | Particle statistics | | | Surface Area |
|---|---|---|---|---|
| | d10 | d50 | d90 | Blaine# (m²/kg) |
| Type I | 4-7 | 18-22 | 40-60 | 300-400 |
| Type III | 1-3 | 8-12 | 20-30 | 500-700 |
| Broad | 1-3 | 8-18 | 40-120 | 400-600 |

TABLE 17

Particle size distribution statistics of example cements
compared with samples of type I and type III Portland cement

| | Particle statistics | | |
|---|---|---|---|
| | d10 (μm) | d50 (μm) | d90 (μm) |
| Industrial sample | 1.50 | 13.66 | 33.69 |
| Broad reduced d50 | 2.45 | 12.67 | 79.51 |
| Broad increased d50 | 1.288 | 22.36 | 115.29 |
| Type I | 6.38 | 22.43 | 51.29 |
| Type III | 1.89 | 9.88 | 24.59 |

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A composition comprising:
    calcium silicate in the form of one or more discrete crystalline calcium silicate phases selected from CS (wollastonite or pseudowollastonite), C3S2 (rankinite), and C2S (belite, larnite, bredigite), and
    calcium silicate in the form of an amorphous calcium silicate phase,
    wherein the one or more discrete crystalline calcium silicate phases are present at about 30% or more by mass of the total phases;
    elemental Ca and elemental Si are present in the composition at a molar ratio from about 0.8 to about 1.2; and
    metal oxides of Al, Fe and Mg are present in the composition at about 30% or less by mass,
    wherein the composition is carbonatable with $CO_2$ at a temperature of about 30° C. to about 90° C. to form $CaCO_3$ with a mass gain of about 10% or more.

2. The composition of claim 1, comprising one or more residual $SiO_2$ and CaO phases.

3. The composition of claim 1, comprising one or more melilite phases having the general formula $(Ca,Na,K)_2[(Mg, Fe^{2+},Fe^{3+},Al,Si)_3O_7]$ or ferrite phases having the general formula $Ca_2(Al,Fe^{3+})_2O_5$.

4. The composition of claim 1, wherein the composition comprises calcium silicate phases existing in an amorphous state and calcium silicate phases existing in a crystalline state.

5. The composition of claim 1, wherein the composition comprises calcium silicate phases existing in both the crystalline state and the amorphous state.

6. The composition of claim 1, wherein Al, Fe and Mg or other trace impurities are present by substitution in any crystalline calcium silicate or incorporated within the amorphous calcium silicate phase.

7. The composition of claim 1, wherein the molar ratio of elemental Ca to elemental Si is from about 0.90 to about 1.10.

8. The composition of claim 6, comprising about 25% or less of metal oxides of Al, Fe and Mg by total oxide mass.

9. The composition of claim 1, wherein reactive phases are present at about 30% or more by mass.

10. The composition of claim 9, wherein the reactive phases are present at about 70% or more by mass.

11. The composition of claim 1, wherein CS is present at about 10 wt % to about 60 wt %, C3S2 in about 5 wt % to 50 wt %, C2S in about 5 wt % to 60 wt %, and G CaO in about 0 wt % to 3 wt %.

12. The composition of claim 11, wherein CS is present at about 20 wt % to about 60 wt %, C3S2 in about 10 wt % to 50 wt %, C2S in about 10 wt % to 50 wt % and G CaO in about 0 wt % to 3 wt %.

13. The composition of claim 1, wherein the composition is suitable for carbonation with $CO_2$ at a temperature of about 30° C. to about 90° C. to form $CaCO_3$ with mass gain of 20% or more.

14. A carbonated material produced from the calcium silicate composition of claim 1 via carbonation at a temperature of about 30° C. to about 90° C.

* * * * *